US012732830B2

(12) United States Patent
Cui et al.

(10) Patent No.: US 12,732,830 B2
(45) Date of Patent: Sep. 8, 2026

(54) DEVICE AND METHOD FOR UPLINK REFERENCE SIGNAL TRANSMISSION CONFIGURATION IN POSITIONING

(71) Applicant: Sony Group Corporation, Tokyo (JP)

(72) Inventors: Qimei Cui, Beijing (CN); Wenlu Zhang, Beijing (CN); Haojin Li, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 55 days.

(21) Appl. No.: 18/843,726

(22) PCT Filed: Mar. 8, 2023

(86) PCT No.: PCT/CN2023/080258
§ 371 (c)(1),
(2) Date: Sep. 4, 2024

(87) PCT Pub. No.: WO2023/169459
PCT Pub. Date: Sep. 14, 2023

(65) Prior Publication Data

US 2025/0184759 A1 Jun. 5, 2025

(30) Foreign Application Priority Data

Mar. 11, 2022 (CN) ........................ 202210235137.X

(51) Int. Cl.
*H04W 16/28* (2009.01)
*H04B 7/06* (2006.01)
*H04L 5/00* (2006.01)

(52) U.S. Cl.
CPC .......... *H04W 16/28* (2013.01); *H04B 7/0626* (2013.01); *H04L 5/0048* (2013.01)

(58) Field of Classification Search
CPC ....... H04W 16/28; H04W 24/02; H04W 4/02; H04W 24/08; H04W 64/00; H04B 7/0626;
(Continued)

(56) References Cited

U.S. PATENT DOCUMENTS

2019/0274165 A1* 9/2019 Pu ........................ H04B 17/318
2021/0153040 A1* 5/2021 Zhou ..................... H04W 76/15
2023/0094748 A1* 3/2023 Meng .................... H04L 5/0048
375/267

FOREIGN PATENT DOCUMENTS

CN 1316836 C 5/2007
CN 106992804 A 7/2017
(Continued)

OTHER PUBLICATIONS

International Search Report and Written Opinion mailed on Jun. 9, 2023, received for PCT Application PCT/CN2023/080258, filed on Mar. 8, 2023, 9 pages including English Translation.
(Continued)

*Primary Examiner* — David S Huang
(74) *Attorney, Agent, or Firm* — XSENSUS LLP

(57) ABSTRACT

A method for a network device in a wireless communication system, comprising: instructing a user equipment to send uplink reference signals to the network device using a first set of beams; measuring transmission quality metrics of the uplink reference signals sent in each beam direction of the first set of beams; and instructing the user equipment to send uplink reference signals to the network device for uplink positioning using a second set of beams based at least on a transmission quality metric of an uplink reference signal sent in at least one beam direction of the first set of beams being lower than a threshold. The second set of beams enables the user equipment to avoid sending uplink reference signals in beam directions that are interfered by a
(Continued)

communication link of a hidden node device. The hidden node device is unknown to the network device and the user equipment.

20 Claims, 19 Drawing Sheets

(58) Field of Classification Search
CPC .... H04B 7/0617; H04B 7/0695; H04B 7/088; H04L 5/0048; H04L 5/0023
See application file for complete search history.

(56) References Cited

FOREIGN PATENT DOCUMENTS

| | | | |
|---|---|---|---|
| CN | 110326244 | A | 10/2019 |
| CN | 110999119 | A | 4/2020 |
| CN | 111565062 | A | 8/2020 |
| CN | 113366794 | A | 9/2021 |
| CN | 113475004 | A | 10/2021 |
| CN | 114071735 | A | 2/2022 |
| EP | 3927036 | A1 | 12/2021 |
| WO | 2021/159407 | A1 | 8/2021 |

OTHER PUBLICATIONS

Cewit et al., "Discussion on positioning enhancements for Release 17", 3GPP TSG RAN WG1 103-e, R1-2008718, Oct. 16-Nov. 13, 2020, 8 pages.

* cited by examiner

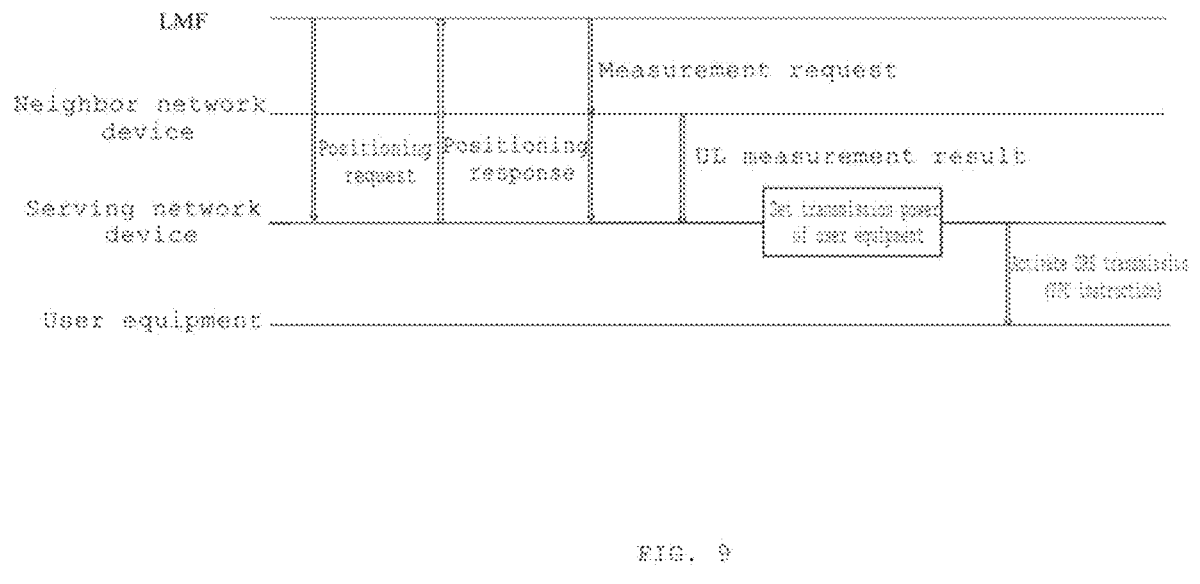

LMF

Measurement request

Neighbor network device

Positioning request

Positioning response

UL measurement result

Serving network device

Set transmission power of user equipment

User equipment

FIG. 9

DEVICE AND METHOD FOR UPLINK REFERENCE SIGNAL TRANSMISSION CONFIGURATION IN POSITIONING

CROSS-REFERENCE TO RELATED APPLICATIONS

The application is a national stage application, pursuant to 35 U.S.C. § 371, of International Patent Application No. PCT/CN2023/080258, filed on Mar. 8, 2023, which claims priority to a Chinese patent application filed with the China Patent Office on Mar. 11, 2022, with application number 202210235137.X, the entire contents of each are incorporated by reference into this application.

TECHNICAL FIELD

The present disclosure relates generally to devices and methods used in wireless communication systems, and specifically to techniques for uplink reference signal transmission configurations in positioning in wireless communication systems.

BACKGROUND

Wireless communication systems can use a variety of protocols and standards for data transmission between devices. These protocols and standards have experienced long-term development, including but not limited to the 3rd Generation Partnership Project (3GPP), 3GPP Long Term Evolution (LTE) (for example, 4G communications), 3GPP New Radio (NR) (for example, 5G communications), and the IEEE 802.11 standard for wireless local area networks (WLAN) (also commonly referred to as Wi-Fi), among others.

In wireless communication systems, in order to support location estimation in terrestrial wireless networks, network devices may estimate the location of a mobile user equipment by measuring radio frequency (RF) reference signals from the mobile user equipment, thereby achieving positioning.

As an example, a method for determining the location of a user equipment may include configuring the user equipment to transmit uplink reference signals (e.g., sounding reference signals (SRSs)) to two or more network devices, and measuring a time difference of arrival of the uplink reference signals received by at least two network devices from the user equipment to calculate respective distance difference. For any two of the aforementioned network devices, the user equipment is located on a hyperbola with the two network devices as foci and with the difference of distances from them as constant difference. Measuring time difference of arrival between multiple pairs of network devices enables obtaining the location of the user equipment by solving for hyperbola foci. In addition to the time difference of arrival (TDOA) positioning method, various methods such as angle of arrival (AOD) positioning and multi-round trip time (Multi-RTT) positioning may also be used for uplink positioning.

Data transmission at higher frequencies (such as millimeter wave bands) is supported in communication networks such as 5G, where both user equipments and network devices may use directional beams for directional transmission to achieve higher throughput. In the process of uplink positioning, transmission configurations (for example, beam configuration, power configuration, etc.) for uplink reference signals of devices are very important. In this case, it is necessary to properly configure uplink reference signals of devices in higher frequency wireless communication systems to achieve high-precision uplink positioning.

SUMMARY

The present disclosure proposes devices and methods for uplink reference signal transmission configurations in positioning in wireless communication systems. More specifically, the present disclosure proposes a transmission beam configuration for uplink reference signals for uplink positioning, in which spatial relationship of the uplink reference signals is updated and enhanced, thereby improving the effectiveness and reliability of uplink positioning.

According to a first aspect of the present disclosure, there is provided a network device in a wireless communication system, the network device comprising a processing circuit configured to cause the network device to perform the following operations: instructing a user equipment in the wireless communication system to send uplink reference signals to the network device using a first set of beams; measuring transmission quality metrics of the uplink reference signals sent in each beam direction of the first set of beams; and instructing the user equipment to send uplink reference signals to the network device for uplink positioning using a second set of beams based at least on a transmission quality metric of an uplink reference signal sent in at least one beam direction of the first set of beams being lower than a threshold, wherein, the second set of beams enables the user equipment to avoid sending uplink reference signals in beam directions that are interfered by a communication link of a hidden node device, wherein the hidden node device is unknown to the network device and the user equipment.

Correspondingly, according to the first aspect of the present disclosure, there is further provided a method for a network device in a wireless communication system, the method comprising: instructing a user equipment the wireless communication system to send uplink reference signals to the network device using a first set of beams; measuring transmission quality metrics of the uplink reference signals sent in each beam direction of the first set of beams; and instructing the user equipment to send uplink reference signals to the network device for uplink positioning using a second set of beams based at least on a transmission quality metric of an uplink reference signal sent in at least one beam direction of the first set of beams being lower than a threshold, wherein, the second set of beams enables the user equipment to avoid sending uplink reference signals in beam directions that are interfered by a communication link of a hidden node device, wherein the hidden node device is unknown to the network device and the user equipment.

According to a second aspect of the present disclosure, there is provided a user equipment in a wireless communication system, the user equipment comprising a processing circuit configured to cause the user equipment to perform the following operations: receiving an instruction from a network device in the wireless communication system to send uplink reference signals to the network device using a first set of beams; sending uplink reference signals to the network device in each beam direction of the first set of beams for the network device to measure transmission quality metrics of the uplink reference signals; receiving an instruction from the network device to send uplink reference signals to the network device using a second set of beams, wherein the instruction is sent based at least on a transmission quality metric of an uplink reference signal sent in at least one beam direction of the first set of beams being lower than a threshold; and sending uplink reference signals to the network device for uplink positioning using the second set of beams, wherein, the second set of beams enables the user equipment to avoid sending uplink reference signals in beam directions that are interfered by a communication link of a hidden node device, wherein the hidden node device is unknown to the network device and the user equipment.

Correspondingly, according to the second aspect of the present disclosure, there is further provided a method for a user equipment in a wireless communication system, the method comprising: receiving an instruction from a network device in the wireless communication system to send uplink reference signals to the network device using a first set of beams; sending uplink reference signals to the network device in each beam direction of the first set of beams for the network device to measure transmission quality metrics of the uplink reference signals; receiving an instruction from the network device to send uplink reference signals to the network device using a second set of beams, wherein the instruction is sent based at least on a transmission quality metric of an uplink reference signal sent in at least one beam direction of the first set of beams being lower than a threshold; and sending uplink reference signals to the network device for uplink positioning using a second set of beams, wherein, the second set of beams enables the user equipment to avoid sending uplink reference signals in beam directions that are interfered by a communication link of a hidden node device, wherein the hidden node device is unknown to the network device and the user equipment.

According to a third aspect of the present disclosure, there is provided a computer-readable storage medium having one or more instructions stored thereon, which, when executed by one or more processors of an electronic device, cause the electronic device to perform the methods according to various embodiments of the present disclosure.

According to a fourth aspect of the present disclosure, there is provided a computer program product including program instructions, which, when executed by one or more processors of a computer, cause the computer to perform the methods of various embodiments according to the present disclosure.

Additionally or alternatively, the present disclosure further proposes a transmission power configuration for uplink reference signals for uplink positioning, in which transmission power for the uplink reference signals reaching network devices of a plurality of cells is set and updated, thereby improving the accuracy and reliability of uplink positioning.

The above summary is provided to summarize some exemplary embodiments in order to provide a basic understanding to various aspects of the subject matter described herein. Therefore, above features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be obtained when the following detailed description of embodiments is considered in conjunction with the accompanying drawings. The same or similar reference numbers are used throughout various drawings to denote the same or similar components. The accompanying drawings, along with the following detailed description, are incorporated in and constitute a part of this specification, to illustrate embodiments of the disclosure and to explain the principles and advantages of the disclosure. Wherein:

FIG. 9 illustrates a schematic diagram of information interaction for a power initial configuration for uplink positioning of a wireless communication system according to an embodiment of the present disclosure.

Figure 1:
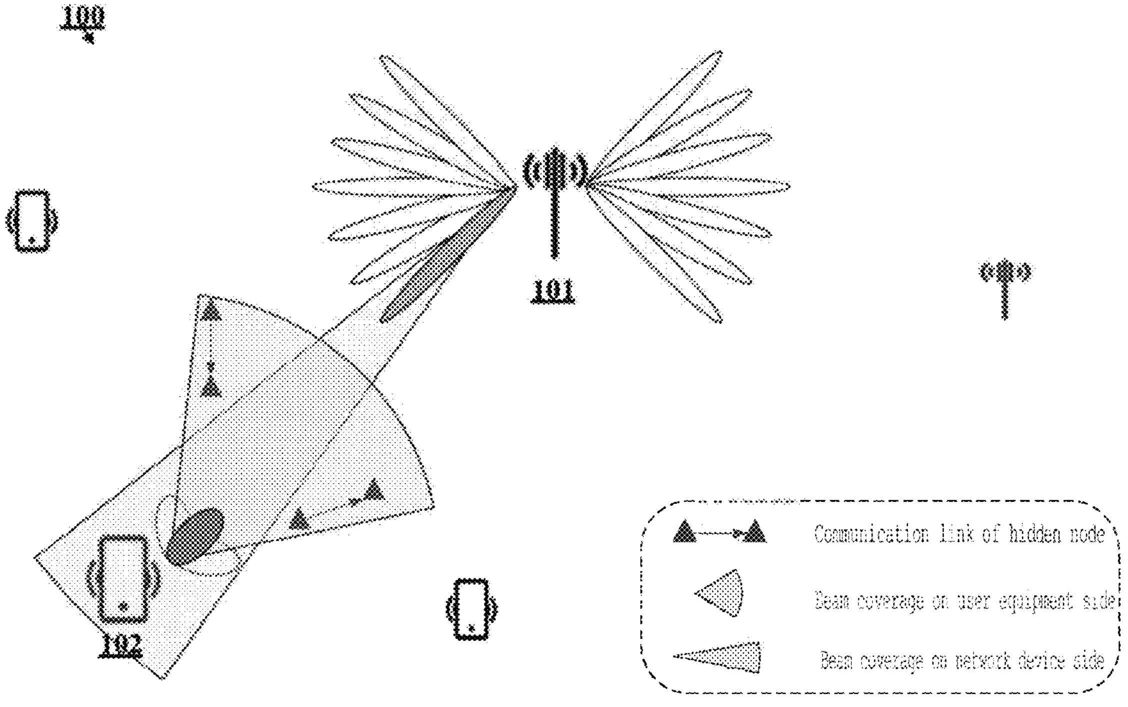
FIG. 1 illustrates an example scenario diagram of a wireless communication system according to an embodiment of the present disclosure.

While the embodiments described in this disclosure may be susceptible to various modifications and alternatives, specific embodiments thereof are illustrated by way of example in the accompanying drawings and are described in detail herein. It should be understood, however, that the drawings and detailed description thereof are not intended to limit the embodiments to the particular forms disclosed; rather, it is intended to cover all modifications, equivalents and alternative falling within the spirit and scope of the claims.

DETAILED DESCRIPTION

Representative applications of various aspects of devices and methods according to the present disclosure are described below. The description of these examples is merely to add context and aid in understanding the described embodiments. Therefore, it will be apparent to those skilled in the art that the embodiments described below may be practiced without some or all of the specific details. In other instances, well-known process steps have not been described in detail to avoid unnecessarily obscuring the described embodiments. Other applications are also possible, and the solution of the present disclosure is not limited to these examples.

Typically, a wireless communication system includes at least a network device and user equipments, and the network device may provide communication services for one or more user equipments.

In this disclosure, the term “network device” (or “base station”, “control device”) has the full breadth of its ordinary meaning and includes at least a wireless communication station that is part of a wireless communication system or a radio system to facilitate communication. As an example, the network device may be an eNB in the 4G communication standard, a gNB in the 5G communication standard, a remote radio head, a wireless access point, a drone control tower, or a communication apparatus that performs similar functions. In this disclosure, “network device”, “base station” and “control device” may be used interchangeably, or “network device” may be implemented as a part of “base station”. Hereinafter, the network device will be used as an example to describe application examples in detail in conjunction with the accompanying drawings.

In this disclosure, the term “user equipment (UE)” or “terminal device” has the full breadth of its ordinary meaning and includes at least a terminal device that is part of a wireless communication system or a radio system to facilitate communication. As an example, the user equipment may be, for example, a terminal device such as a mobile phone, a laptop, a tablet, a vehicle-mounted communication device, a wearable device, a sensor, or the like, or elements thereof. In this disclosure, “user equipment” (hereinafter may be referred to as “UE” for short) and “terminal device” may be used interchangeably, or “user equipment” may be implemented as a part of “terminal device”.

In this disclosure, the terms “network device side”/“base station side” have the full breadth of their ordinary meaning, generally indicating the side in a downlink of a communication system that sends data, or the side in an uplink of a communication system that receives data. Similarly, the terms “user equipment side”/“terminal device side” have the full breadth of their ordinary meaning, and accordingly may indicate the side in a downlink of a communication system that receives data, or may indicate the side in an uplink of a communication system that sends data.

It should be noted that, although the embodiments of the present disclosure are mainly described below based on a communication system including a network device and user equipments, these descriptions may be accordingly extended to cases that a communication system includes any other type of network device side and user equipment side. For example, operations on the network device side may correspond to operations on the base station, while operations on the user equipment side may accordingly correspond to operations on the terminal device.

FIG. 1 illustrates an example scenario diagram of a wireless communication system according to an embodiment of the present disclosure. It should be understood that FIG. 1 illustrates only one of many types and possible arrangements of wireless communication systems; the features of the present disclosure may be implemented in any of the various systems as desired.

As shown in FIG. 1, a wireless communication system 100 includes one or more network devices 101 and one or more user equipments 102. The network devices and the user equipments may be configured to communicate over a wireless transmission medium. The network device 101 may be further configured to communicate with a location management function entity (not shown) in a core network, and perform transmission configuration on uplink reference signals to be sent by a user equipment and notify the user equipment of the transmission configuration, for uplink positioning. According to an embodiment of the present disclosure, one example of an uplink reference signal is a sounding reference signal (SRS), so “uplink reference signal” and “sounding reference signal” (or “SRS”) may be used interchangeably herein. It should be understood that the uplink reference signal may also be other reference signals sent by a user equipment known to those skilled in the art.

As shown in FIG. 1, in wireless communication systems using higher frequencies (such as millimeter wave bands), both the network device side and the user equipment side may use an antenna array including multiple antenna elements to form a directional beam, which may improve transmission efficiency and system throughput.

During the process of uplink positioning, a network device may receive an SRS sent from a user equipment through beam scanning. Due to beams of high-frequency band signals usually having characteristics of large in number and narrow beams, beam scanning on the network device side requires multiple beam switching, resulting in significant latency and overhead. Meanwhile, when the user equipment performs SRS transmission, it not only needs to wait for the opportunity for SRS transmission, but also needs to repeatedly transmit the SRS so as to let a sufficient number of network devices detect the SRS to achieve more precision uplink positioning. In some existing solutions, it is proposed that the user equipment performs beam scanning to send SRS to reduce latency and overhead of the network device. However, in a case that user equipments are more densely distributed, the network device still needs to continuously and repeatedly perform beam scanning in order to detect SRSs from more user equipments to improve uplink coverage. Therefore, in actual scenarios, regardless of whether beam scanning is performed on the user equipment side, beam scanning on the network device side cannot be avoided. Therefore, they all take long time to achieve higher-precision positioning requirements.

Due to large latency in uplink positioning, channel state of the system is likely to change significantly during this period. Specifically, for example, a large number of devices using different radio access technologies (RATs) (such as cellular communication technology, Wi-Fi technology, Bluetooth technology, etc.) may be deployed in unlicensed high-frequency bands (such as the 60 GHz millimeter wave band, etc.). These devices may be unknown to both the network device and the user equipment during the uplink positioning process, and are therefore referred to herein as "hidden nodes" or "hidden node devices". Communication links of these hidden node devices are more likely to cause interference to the SRS transmission process, thereby causing large changes in the channel state of SRS transmission. Since neither network device nor user equipment may predict the emergence of hidden nodes, the channel state change during their uplink positioning process is random and unpredictable.

In some existing uplink positioning solutions, beam transmission direction of an uplink is determined according to directional beam transmission direction of a downlink between a network device and a user equipment. As an example, by indicating a spatial relationship of a quasi-co-location association between an uplink reference signal and a downlink reference signal used for uplink positioning, a user equipment is enabled to send the uplink reference signal using an uplink beam corresponding to a downlink beam trained to receive the downlink reference signal directly based on previous measurement results of downlink reference signals. However, these solutions are not applicable in unlicensed millimeter wave bands. As shown in FIG. 1, since the number of antennas of the network device is usually much greater than the number of antennas of the user equipment, the beam width on the network device side is much narrower than that on the user equipment side, causing serious uplink and downlink beam asymmetry problems. In this frequency band, the uplink and downlink channel states no longer have reciprocity, so channel conditions in the uplink transmit direction of a beam cannot be inferred from the quality of the downlink reference signal received by the beam. As an example, it may be seen from FIG. 1 that, the downlink transmission between the network device and the user equipment is not interfered by communication links of hidden nodes. Therefore, the measured transmission quality metric of the downlink reference signal is high, but the uplink reference signal transmission will be interfered by communication links of hidden nodes, thus, the method of performing transmission configuration for the uplink reference signal based on the reception quality of the downlink reference signal is not applicable in unlicensed millimeter wave bands.

It should be understood that according to an embodiment of the present disclosure, examples of downlink reference signals include synchronization signal blocks (SSB), channel state information reference signals (CSI-RS), and/or positioning reference signals (PRS), so herein, "downlink reference signal" and "SSB/CSI-RS/PRS" may be used interchangeably. It should be understood that the downlink reference signal may also be other reference signals sent by network devices known to those skilled in the art. According to an embodiment of the present disclosure, transmission quality metrics include but are not limited to one of the following or a combination of a plurality of the following: network reference signal received power (RSRP), reference signal received quality (RSRQ), signal to interference plus noise ratio (SINR), decoding rate.

In communications in unlicensed millimeter wave bands, a user equipment may perform a listen-before-talk (LBT) operation before communicating with a network device. If a hidden node is located within the coverage of uplink beams of the user equipment (as shown in FIG. 1), the user equipment may discover the existence of the communication link of the hidden node during a directional LBT operation, thereby determining not to send SRS to the network device on the beam in the corresponding direction to avoid interference. However, hidden nodes may be located within the reverse coverage of beams of the user equipment. In this case, when the transmission direction of the communication link of a hidden node is the same or close to the uplink beam direction from the user equipment to the network device, the user equipment cannot discover the hidden node during the LBT operation, but the uplink transmission will be interfered by the communication link of the hidden node, thereby the performance of uplink positioning may be affected severely.

In summary, in high-frequency wireless communication systems such as unlicensed millimeter wave bands, large latency caused by beam scanning during the uplink positioning process are almost unavoidable. During this long period of time, a communication link of a hidden node may cause interference to uplink SRS transmission from a user equipment to a network device, and this interference sometimes cannot be detected through LBT operation. At the same time, since uplink and downlink channels in high-frequency band communications do not have reciprocity, a trained downlink configuration cannot be simply set as an uplink configuration. Therefore, a reliable and efficient SRS transmission configuration for uplink positioning is needed so that it may avoid interference from communication links of hidden nodes as much as possible during the SRS transmission process and improve the accuracy and reliability of uplink positioning.

In order to solve the above problems, the present disclosure provides a method for SRS transmission configuration for uplink positioning. According to an embodiment of the present disclosure, during an SRS transmission process, some uplink beams with poor transmission quality metrics may be updated based on measurements of transmission quality metrics in beam directions of each SRS transmission by a network device, so that a user equipment switches to uplink beams that can achieve better transmission quality metrics as soon as possible to send SRS. In addition, according to an embodiment of the present disclosure, during an SRS transmission process, a network device may configure SRS transmission power of a user equipment based on uplink measurement results and/or auxiliary information received from the user equipment, so that the user equipment increases power adaptively in SRS resource transmission that is subject to greater interference, thereby reducing the impact of interference.

Figure 2:
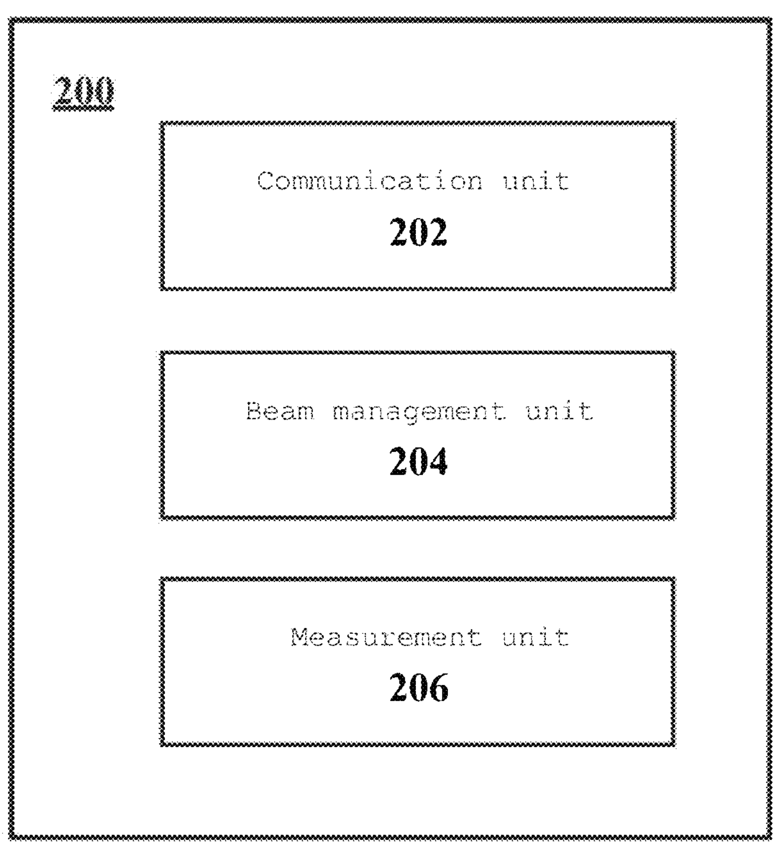
FIG. 2 illustrates an exemplary electronic device for a network device according to an embodiment of the present disclosure.

FIG. 2 illustrates an exemplary electronic device for network device 101 according to an embodiment of the present disclosure. The electronic device 200 shown in FIG. 2 may include various units to implement various embodiments according to the present disclosure. In this example, the electronic device 200 includes a communication unit 202, a beam management unit 204 and a measurement unit 206. In one implementation, the electronic device 200 is implemented as the network device 101 itself or a part thereof, or as a device associated with the network device 101 or a part of the device. Various operations described below in conjunction with the network device may be implemented by the units 202, 204, 206 of the electronic device 200 or other possible units. It should be understood that units 202, 204 and 206 may be included or integrated in a processing circuit of the network device 101.

In an embodiment, the communication unit 202 may be configured to send signals to or receive signals from the user equipment 102 in the wireless communication system 100. For example, the communication unit 202 may, under the instruction of the beam management unit 204, send information to the user equipment 102, where the information instructs the user equipment 102 to send uplink reference signals using a first set of beams to the network device 101. Thereafter, the communication unit 202 may receive the uplink reference signals sent from the user equipment 102 using the first set of beams, wherein the measurement unit 206 may measure transmission quality metrics of the uplink reference signals sent in each beam direction of the first set of beams. The beam management unit 204 may instruct the communication unit 202 to send a message to the user equipment 102 based at least on a transmission quality metric of an uplink reference signal sent in at least one beam direction of the first set of beams being lower than a threshold, the message instructing the user equipment 102 to send uplink reference signals using a second set of beams to the network device 101 for uplink positioning. According to an embodiment of the present disclosure, the second set of beams may enable the user equipment 102 to avoid transmitting uplink reference signals in beam directions that are interfered by a communication link of a hidden node device. As mentioned previously, the hidden node device may be unknown to the network device 101 and the user equipment 102.

Additionally or alternatively, the electronic device 200 may further include a power management unit (not shown), which may instruct a transmission power configuration for uplink reference signals to the user equipment based at least on uplink measurement results and/or auxiliary information received from the user equipment for uplink positioning.

Figure 3:
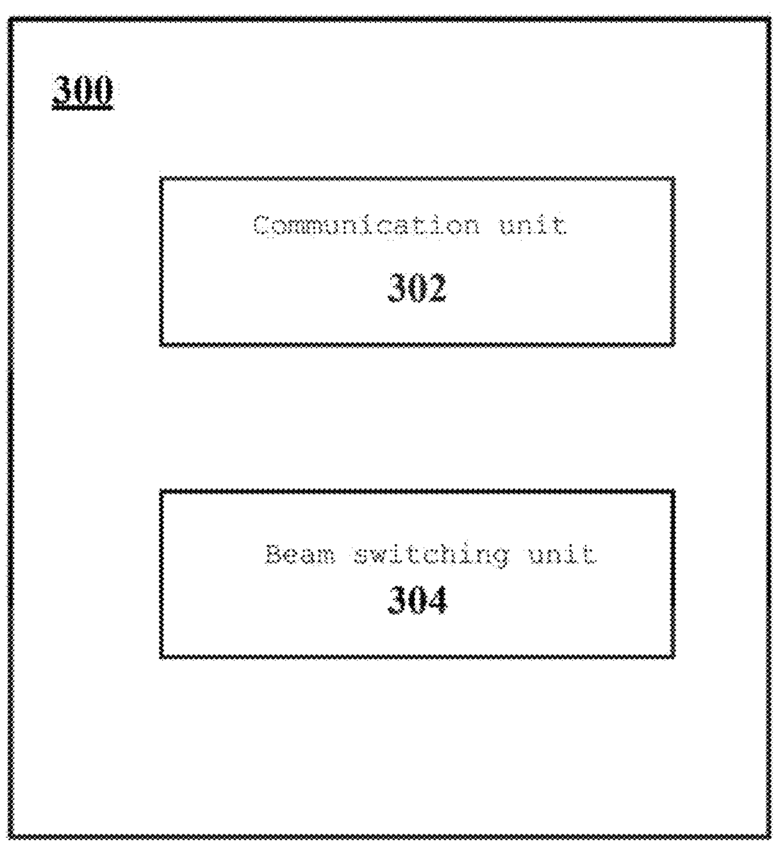
FIG. 3 illustrates an exemplary electronic device for a user equipment according to an embodiment of the present disclosure.

FIG. 3 illustrates an exemplary electronic device 300 for a user equipment 102 in system 100 in accordance with an embodiment of the present disclosure. The electronic device 300 shown in FIG. 3 may include various units to implement various embodiments according to the present disclosure. In this example, the electronic device 300 includes a communication unit 302 and a beam switching unit 304. In one implementation, the electronic device 300 is implemented as the user equipment 102 itself or a part thereof, or as a device for controlling or otherwise associated with the user equipment 102 or a part of the device. Various operations described below in conjunction with the user equipment may be implemented by the units 302, 304 of the electronic device 300 or other possible units. It should be understood that units 302 and 304 may be included or integrated in a processing circuit of the user equipment 102.

In an embodiment, the communication unit 302 may be configured to send signals to or receive signals from the network device 101 in the wireless communication system 100. For example, the communication unit 302 may receive a message from the network device 101, which instructs the user equipment 102 to send uplink reference signals to the network device 101 using a first set of beams. Thereafter, the beam switching unit 304 may instruct the communication unit 302 to send uplink reference signals to the network device 101 in each beam direction of the first set of beams, so that the network device 101 measures transmission quality metrics of these uplink reference signals. Then, the communication unit 302 may receive a message from the network device 101, which instructs the user equipment 102 to send uplink reference signals using a second set of beams to the network device 101, wherein the message is sent by the network device 101 based at least on a transmission quality metric of an uplink reference signal sent in at least one beam direction of the first set of beams being lower than a threshold. Accordingly, the beam switching unit 304 may instruct the communication unit 302 to send uplink reference signals using a second set of beams to the network device 101 for uplink positioning. According to an embodiment of the present disclosure, the second set of beams may enable the user equipment 102 to avoid sending uplink reference signals in beam directions that are interfered by a communication link of a hidden node device. As mentioned previously, the hidden node device may be unknown to the network device 101 and the user equipment 102.

Additionally or alternatively, the electronic device 300 may further include a power adjustment unit (not shown), which may instruct, based on a transmission power configuration indicated by the network device, the communication unit 302 to send uplink reference signals using corresponding power for uplink positioning. The above transmission power configuration is based at least on uplink measurement results of the network device and/or auxiliary information received by the network device from the user equipment.

In some embodiments, the electronic devices 200 and 300 may be implemented at the chip level, or may also be implemented at the device level by including other external components (e.g., radio links, antennas, etc.). For example, each electronic device may function as a communication device as a whole.

It should be noted that above units are only logical modules divided according to specific functions they implement, and are not used to limit specific implementations, for example, they may be implemented in software, hardware, or a combination of software and hardware. In practical implementations, above units may be implemented as independent physical entities, or may also be implemented by a single entity (e.g., a processor (CPU or DSP, etc.), an integrated circuit, etc.). Wherein, the processing circuit may refer to various implementations of digital circuitry, analog circuitry, or mixed-signal (combination of analog and digital) circuitry that perform functions in a computing system. The processing circuits may include, for example, circuits such as Integrated Circuits (ICs), Application Specific Integrated Circuits (ASICs), portions or circuits of individual processor cores, entire processor cores, individual processors, programmable hardware devices such as Field Programmable Gate Arrays (FPGAS), and/or systems including multiple processors.

<Beam Configuration in SRS Transmission for Positioning>

The present disclosure proposes a transmission beam configuration for uplink reference signals for uplink positioning, in which a spatial relationship of the uplink reference signals is set and updated, thereby improving the accuracy and reliability of uplink positioning.

SRS Initial Configuration

According to an embodiment of the present disclosure, one or more SRS resource sets may be configured for a user equipment, wherein each SRS resource set may include a plurality of resources, and wherein each SRS resource may be transmitted using one corresponding uplink transmit beam. When an SRS resource set is used for beam management, the same SRS resource set only transmits one SRS resource at the same time, but SRS resources in different SRS resource sets may be transmitted at the same time. It is understood that “SRS resource” and “SRS” may sometimes be used interchangeably herein.

According to an embodiment of the present disclosure, an SRS resource set may be performed transmission configuration through downlink control information (DCI) in a radio resource control (RRC) information element or through a high-level parameter such as medium access control (MAC)-control element (CE).

Before officially transmitting SRS for uplink positioning, a network device may perform SRS initial configuration on a user equipment. According to an embodiment of the present disclosure, an SRS initial configuration may include an SRS initial default configuration and an SRS revise configuration. Hereinafter, one SRS resource set will be used as an example to describe the SRS initial configuration process in detail.

SRS Initial Default Configuration

The configuration of SRS resources may be achieved by configuring a spatial relationship thereof. Specifically, the spatial relationship may refer to a quasi-co-located (QCL) association of an uplink reference signal and a downlink reference signal. The indication of the beam direction of an uplink reference signal may be achieved by indicating a downlink reference signal having a QCL association with the uplink reference signal. For example, one SSB/CSI-RS/PRS with QCL association may be configured for one SRS (for example, in an NR system, the QCL association may also be called QCL-TypeD association), then a user equipment may send the SRS using a downlink receive beam that receives the SSB/CSI-RS/PRS. Therefore, a set of SSBs/CSI-RSs/PRSs may be configured for the SRS resource set for uplink positioning, wherein the set of SSBs/CSI-RSs/PRSs may correspond to a plurality of downlink receive beam directions on the user equipment side, so that SRS resources in the SRS resource set are transmitted in corresponding a plurality of uplink transmit beam directions.

The initial default configuration for SRS may be divided into the following two situations:

Case 1: The Number of SSBs/CSI-RSs/PRSs≥the Number of SRSs in the SRS Resource Set In this case, the same number of SSBs/CSI-RSs/PRSs as SRSs may be randomly selected, these SSBs/CSI-RSs/PRSs corresponding to different beam directions, and then they are performed QCL association with the SRSs respectively. Preferably, beam directions corresponding to the selected SSBs/CSI-RSs/PRSs are distributed as evenly as possible at various spatial angles around the user equipment.

Case 2: The Number of SSBs/CSI-RSs/PRSs<the Number of SRSs in the SRS Resource Set In this case, when the number of SSBs/CSI-RSs/PRSs is much less than that of SRSs, the SRSs in the SRS resource set may be divided into a plurality of groups, and SRSs in each SRS group are performed QCL association with one SSB/CSI-RS/PRS; and when the number of SSBs/CSI-RSs/PRSs is slightly less than that of SRSs, a plurality of SRSs may be performed QCL association with a SSB/CSI-RS/PRS centered in the beam direction, and other SRSs may be retained to perform one-to-one QCL association with other SSBs/CSI-RSs/PRSs in different directions.

It should be understood that the above only gives examples of an initial default configuration for SRSs and is not intended to be limiting. Other methods that may be conceived by those skilled in the art may be used to perform an initial default spatial relationship configuration for SRSs.

SRS Revise Configuration

In some embodiments, a user equipment has previously measured or trained on downlink reference signals and has stored corresponding result information. For example, the user equipment may store the latest downlink reference signal measurement result, and the measurement result may reflect path losses in beam directions corresponding to downlink reference signals. As an example, but not a limitation, the user equipment may store by using a bitmap and the like and mark SSBs/CSI-RSs/PRSs whose downlink transmission quality metrics are greater than a specific threshold. Although the reciprocity characteristics of uplink and downlink channels cannot be directly utilized in unlicensed millimeter wave bands, the measurement result of downlink reference signals still have reference significance for transmission of uplink reference signals. Therefore, the SRS initial default configuration may at least be revised based on the measurement result of the downlink reference signals, thereby improving the performance of the SRS initial configuration to a certain extent.

Information Interaction and Process of SRS Initial Configuration

Figure 4A:
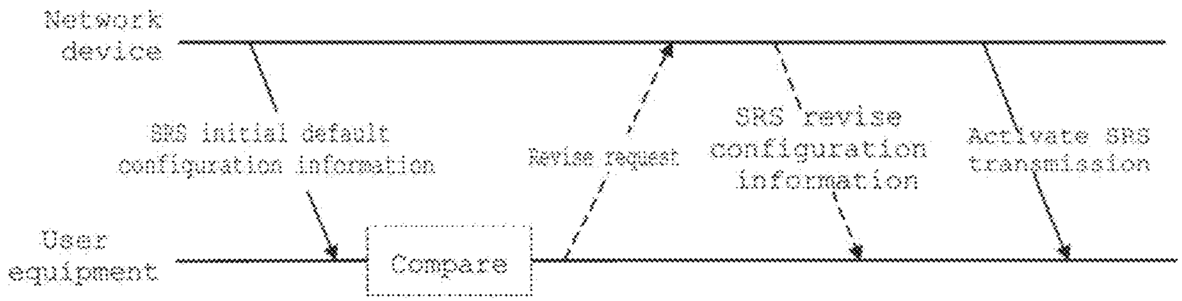
FIG. 4A illustrates an information interaction diagram of an initial default configuration and a revise configuration process in a beam configuration for uplink reference signals for uplink positioning according to an embodiment of the present disclosure.

FIG. 4A illustrates an information interaction diagram of an initial default configuration and a revise configuration process in a beam configuration for uplink reference signals for uplink positioning according to an embodiment of the present disclosure. During the process of uplink positioning, for example, after a network device receives a positioning request sent by a location management function entity (LMF), it may send SRS initial default configuration information to a user equipment, which specifies a set of downlink reference signals (for example, SSBs/CSI-RSs/PRSs) that have QCL association with uplink reference signals (for example, SRSs). Optionally, after receiving the SRS initial default configuration information, the user equipment may compare the downlink reference signals specified in the information with its own stored downlink reference signal measurement results. If the difference between the two is large (for example, a large proportion of the downlink reference signals specified in the SRS initial default information has previous measurement results worse than a specific threshold (such as path loss is higher than a specific threshold, or a value such as RSRP/RSRQ/SINR is lower than a specific threshold)), the user equipment may send a revise request to the network device, so that the network device may revise the spatial relationship configuration for SRSs based on the latest downlink reference signal measurement results. The network device may send the SRS revise configuration information to the user equipment, wherein the information specifies a revised set of SSBs/CSI-RSs/PRSs that has a QCL association with the SRSs. At this point, the SRS initial spatial relationship configuration ends. Thereafter, the network device may send information activating SRS transmission to the user equipment.

Figure 4B:
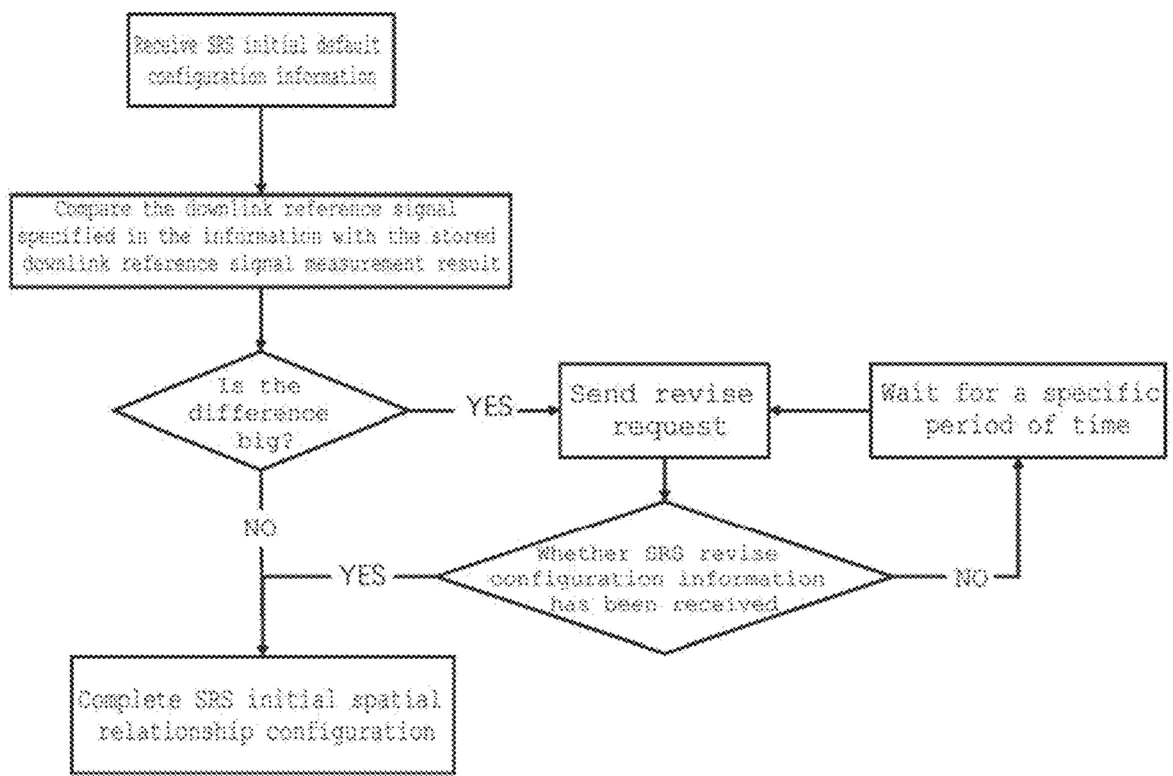
FIG. 4B illustrates a flowchart of an initial default configuration and a revise configuration process in a beam configuration for uplink reference signals for uplink positioning according to an embodiment of the present disclosure.

Corresponding to FIG. 4A, FIG. 4B illustrates a flowchart of an initial default configuration and a revise configuration process in a beam configuration for uplink reference signals for uplink positioning. It should be understood that, considering that factors such as interference or latency may exist in the transmission of the above configuration information, if a user equipment does not receive SRS revise configuration information after sending a revise request, it may consider sending a revise request again after waiting for a period of time. When the number of times of sending a revise request reaches a certain threshold, it may give up sending a revise request directly, and use the SRS initial default configuration as the final initial spatial relationship configuration (not shown in the figure). It should also be understood that in a case that a user equipment has not yet performed previous downlink reference signal measurement or training, it may choose not to perform the comparison operation and use the SRS initial default configuration as the final initial spatial relationship configuration.

SRS Update Configuration

According to an embodiment of the present disclosure, after a network device instructs an SRS initial configuration (including an SRS initial default configuration or an SRS revise configuration) to a user equipment, the user equipment sends SRS resources using a corresponding set of beams (herein, also referred to as "a first set of beams") based on QCL association between a set of downlink reference signals (for example, SSBs/CSI-RSs/PRSs) and uplink reference signals (SRSs) resource indicated in the initial configuration information. Specifically, the user equipment may send an SRS using each beam in the first set of beams. Accordingly, the network device receives these SRSs in sequence, and may measure transmission quality metrics of the SRS sent on each beam in the first set of beams. For ease of explanation, in this section, take the network reference signal received power (RSRP) being a transmission quality metric as an example for description. However, it should be understood that the transmission quality metric may also be the reference signal received quality (RSRQ), signal to interference plus noise ratio (SINR), decoding rate, or a combination thereof (for example, a weighted combination of the above multiple transmission quality metrics). In addition, it may be understood that the network device may maintain a fixed uplink receive beam during the measurement process, which may be, for example, an uplink receive beam with better performance previously determined according to uplink beam scanning.

When the user equipment sends an SRS using the first set of beams, the network device may obtain, according to an index of each of the received SRS, the beam used to send the SRS. During the measurement process, the network device may record the transmission quality metric of each SRS (for example, also labelled as "SRS-RSRP" herein) and compare it with a specific threshold. For example, the threshold may represent the minimum RSRP that meets uplink positioning performance requirements, which is labelled as "M" herein. It should be appreciated that the specific threshold above may be a preset numerical value or a numerical value calculated according to priori measurement information. After the user equipment performs a complete uplink beam scan using the first set of beams, the network device may obtain the complete SRS-RSRP measurement results and find the maximum SRS-RSRP measurement value, which is labelled as "(SRS-RSRP) max" herein. Based on the comparison between SRS-RSRP values corresponding to all SRSs in the measured SRS resource set and the threshold M, the network device may decide whether to perform SRS transmission configuration update (more specifically, the spatial relationship update in the SRS transmission configuration) and how to perform SRS configuration update according to three situations. These three situations will be described in detail below through three use cases (including a first use case, a second use case, and a third use case).

First Use Case: (SRS-RSRP) Max≥M and there is at Least One SRS-RSRP<M

In the first use case, a transmission quality metric of an SRS sent in at least one beam direction of the first set of beams is lower than the threshold M, and a transmission quality metric of an SRS sent in at least one other beam direction of the first set of beams is not lower than the threshold M.

Figure 5A:
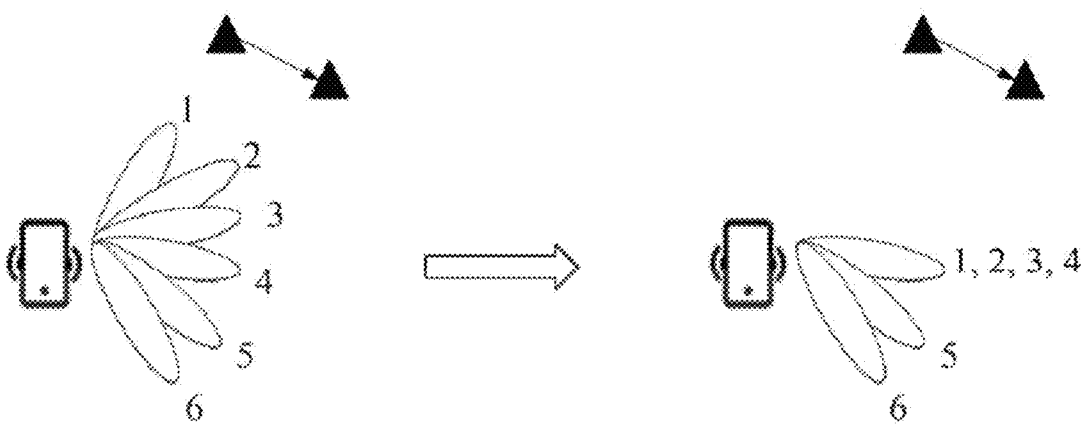
FIGS. 5A-5B illustrate example diagrams of a first use case of uplink reference signal beam configuration for uplink positioning according to embodiments of the present disclosure.
Figure 5B:
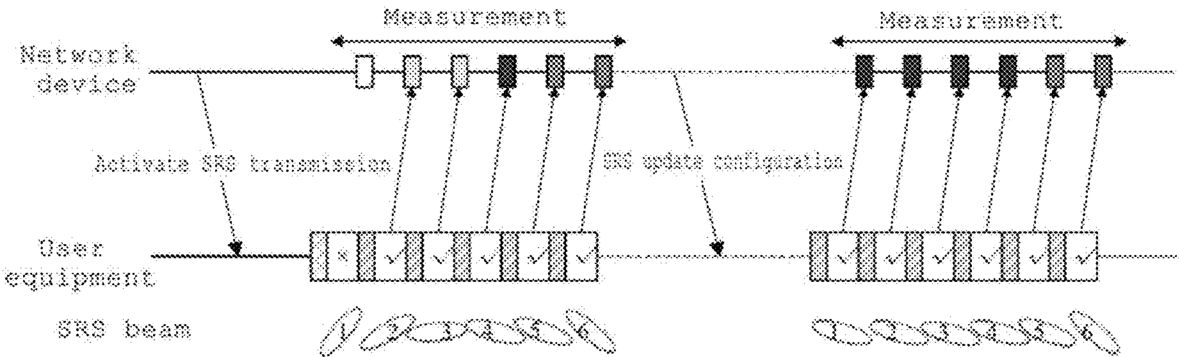
Figure 5B:
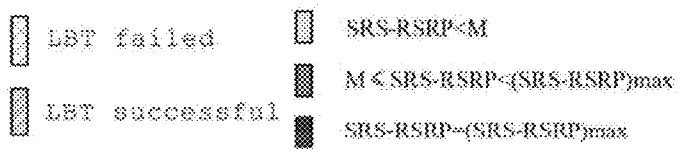

FIGS. 5A and 5B illustrate example diagrams of a first use case of uplink reference signal beam configuration for uplink positioning according to embodiments of the present disclosure. Referring to FIG. 5A, the left half thereof illustrates one example of a first set of beams used by a user equipment. The SRS resource set of an SRS initial configuration of the user equipment includes a total of 6 SRS resources, which use beams 1-6 for uplink transmission respectively for a network device (located on the right side of the user equipment, not shown in the figure) to measure RSRP values of SRSs sent on the 6 beams.

According to FIG. 5A, there is a hidden node within the coverage of beam 1 of the user equipment, and the communication link of the hidden node has a serious impact on beam 1.

Corresponding to the left half of FIG. 5A, the left half of FIG. 5B schematically illustrates the SRS transmission situation between the network device and the user equipment. Since the SRS sent on beam 1 is greatly interfered by collision with communication link of the hidden node, the RSRP measurement value of the SRS sent in this beam direction is almost 0. The SRSs sent on beam 2-3 is also interfered by the communication link of the hidden node to a certain extent, and corresponding SRS-RSRP values are all lower than the threshold M. In contrast, the RSRP measurement value of the SRS sent on beam 4 is the highest among all SRS-RSRP measurement values, that is, equal to (SRS-RSRP) max. Furthermore, the measurement values of the SRSs sent on beam 5-6 are not lower than the threshold M, but lower than (SRS-RSRP) max. According to the RSRP measurement value of the SRS in each beam direction, the network device may roughly infer that there may be a hidden node within the coverage of the uplink beams 1-3 of the user equipment, and SRS resource transmission on beams 1-3 is interfered by the communication link of the communication node.

Additionally or alternatively, during measurement, the user equipment may perform an LBT operation before sending an SRS using a beam. For example, before sending SRS on beam 1, the user equipment may fail to perform LBT, so the user equipment may choose not to send the SRS. In this case, the network device does not receive the SRS sent in the direction of beam 1, so the RSRP measurement value corresponding to the SRS may be recorded as 0. Although LBT was successfully performed on beams 2 and 3, due to communication link of a hidden node blocking their corresponding uplinks to a certain extent, transmission interference occurred, causing SRSs transmitted in these two beam directions suffers serious signal attenuation, so that the signal power reaching the network equipment is small.

According to the present disclosure, in the first use case, the network device may instruct all beams (e.g., beams 1-3) in the first set of beams with RSRP measurements below the threshold M to be updated to beams in the same or similar direction as the beam (e.g., beam 4) with the highest RSRP measurement in the first set of beams, thereby forming a second set of beams. The right half of FIG. 5A and FIG. 5B respectively illustrate example diagrams of the updated second set of beams and corresponding SRS transmission situations. As shown, the network device has sent SRS update configuration information to the user equipment, instructing the user equipment to send SRSs using the second set of beams for uplink positioning. Similar to the initial configuration information of the SRS, the SRS update configuration information indicates a set of SSBs/CSI-RSs/PRSs with QCL association with the updated SRS (the second set of beams corresponds to the receive beams of the set of downlink reference signals, for sending SRS resources). As an example, but not a limitation, in the SRS update configuration information, the network device may use a bitmap to indicate which beams need to be updated (switched), and the information may indicate which beam needs to be switched to. For example, the bitmap may be "111000", indicating that beams 1-3 need to be updated, and the SRS update configuration information may indicate "SRI=4 (wherein SRI represents SRS index)", which indicates that these beams 1-3 are switched to beams with the same beam direction as beam 4 (as shown in FIG. 5A), or they may be switched to have a beam direction close to that of beam 4 (for example, narrower uplink beams within the uplink beam coverage of beam 4).

The transmit direction of the updated beams 1-3 is the same as or close to that of beam 4, so the transmission of SRS may bypass communication link of the hidden node, so that the RSRP value of the SRSs sent on the updated beams 1-6 are not lower than the threshold M. Additionally, when the user equipment performs LBT, the LBT may be successfully performed in transmit beam directions corresponding to all the updated SRSs. After the SRS configuration is updated, the RSRP value of each SRS received by the network device is large enough, so the accuracy of uplink positioning may be improved. It should be understood that FIG. 5A and FIG. 5B exemplarily illustrate the situation where an updated plurality of beams have the same transmit direction. This process of using the same beam to repeatedly transmit SRS a plurality of times is also called SRS repetition. In practice, it has proven that SRS repetition may enable a network device to detect positioning signals multiple times, which can improve the reliability of positioning.

Second Use Case: (SRS-RSRP) Max≥M and all SRS-RSRP≥M

In the second use case, transmission quality metrics of SRSs sent in all beam directions in the first set of beams are not lower than the threshold M.

Figure 6A:
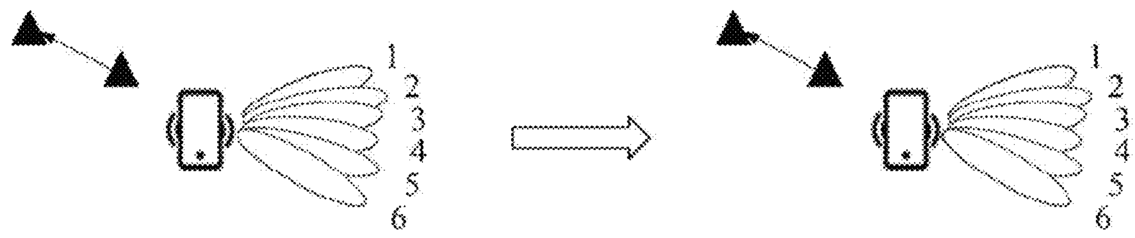
FIGS. 6A-6B illustrate example diagrams of a second use case of uplink reference signal beam configuration for uplink positioning according to embodiments of the present disclosure.
Figure 6B:
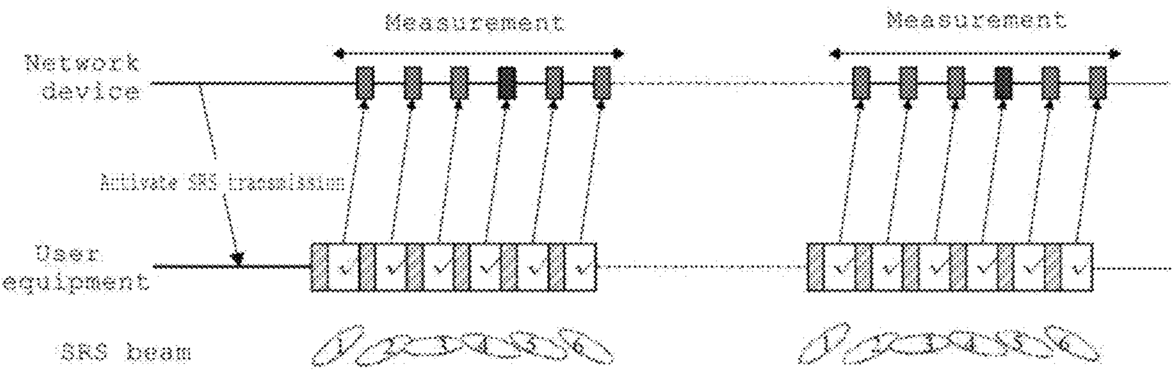
Figure 6B:
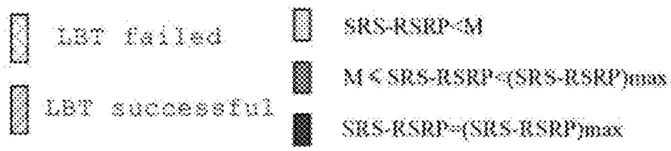

FIGS. 6A and 6B illustrate example diagrams of a second use case of uplink reference signal beam configuration for uplink positioning according to embodiments of the present disclosure. Referring to FIG. 6A, the left half thereof illustrates one example of a first set of beams used by a user equipment. The SRS resource set of an SRS initial configuration of the user equipment includes a total of 6 SRS resources, which use beams 1-6 for uplink transmission respectively for a network device (located on the right side of the user equipment, not shown in the figure) to measure RSRP values of SRSs sent on the 6 beams.

According to FIG. 6A, there is no hidden node within the uplink coverage of beams 1-6 of the user equipment. Hidden nodes are located within the reverse coverage of some beams of the user equipment, but the transmission directions of communication links of the hidden nodes are neither the same as nor close to the beam directions of beams 1-6. Corresponding to the left half of FIG. 6A, the left half of FIG. 6B schematically illustrates the SRS transmission situation between the network device and the user equipment. It may be seen that the communication links of the hidden nodes have little impact on SRS transmission on beams 1-6, so all corresponding SRS-RSRP values are not lower than the threshold M. According to the RSRP measurement value of the SRS in each beam direction, the network device may roughly infer that each uplink beam of the user equipment is less affected by interference from the communication links of the hidden nodes, thereby determining that the uplink channel corresponding to the first set of beams indicated in the SRS initial configuration is in good condition.

Additionally or alternatively, during measurement, the user equipment may perform an LBT operation before sending an SRS using a beam. Since communication link of interfering node does not fall into the coverage of any beam in the uplink beams 1-6, nor is transmission direction of the communication link the same as or close to any beam direction of beams 1-6, it will not cause any interference to SRS uplink transmission, so that the user equipment may successfully perform the LBT operation in all beam directions.

According to the present disclosure, in the second use case, the network device may not instruct the user equipment to use the second set of beams, so that the user equipment continues to use the first set of beams (e.g., beams 1-6) to send uplink reference signals to the network device for uplink positioning. Therefore, in the second use case, the network device does not need to send SRS update configuration information. As shown in the right half of FIG. 6A and FIG. 6B, the user equipment continues to use the first set of beams (e.g., beams 1-6) for SRS transmission for uplink positioning.

Third Use Case: (SRS-RSRP) Max<M

In the third use case, transmission quality metrics of the SRSs sent in all beam directions in the first set of beams are lower than the threshold M.

Figure 7A:
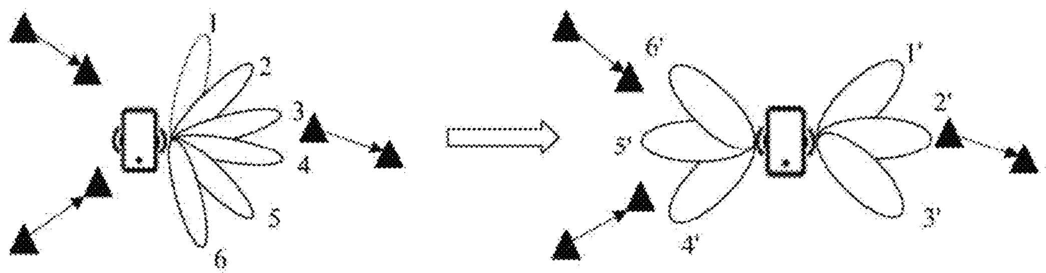
FIGS. 7A-7C illustrate example diagrams of a third use case of uplink reference signal beam configuration for uplink positioning according to embodiments of the present disclosure.
Figure 7B:
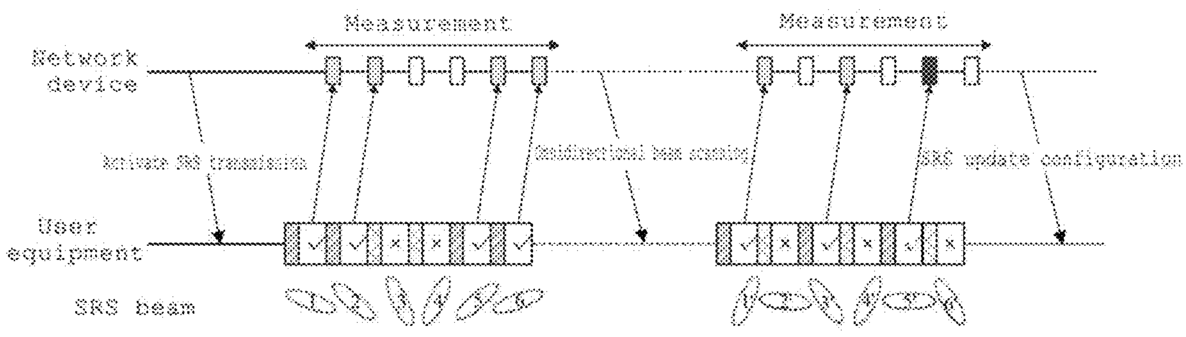
Figure 7B:
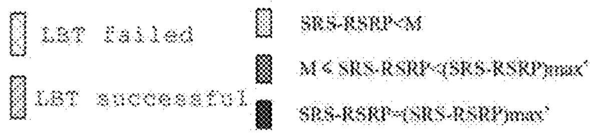
Figure 7C:
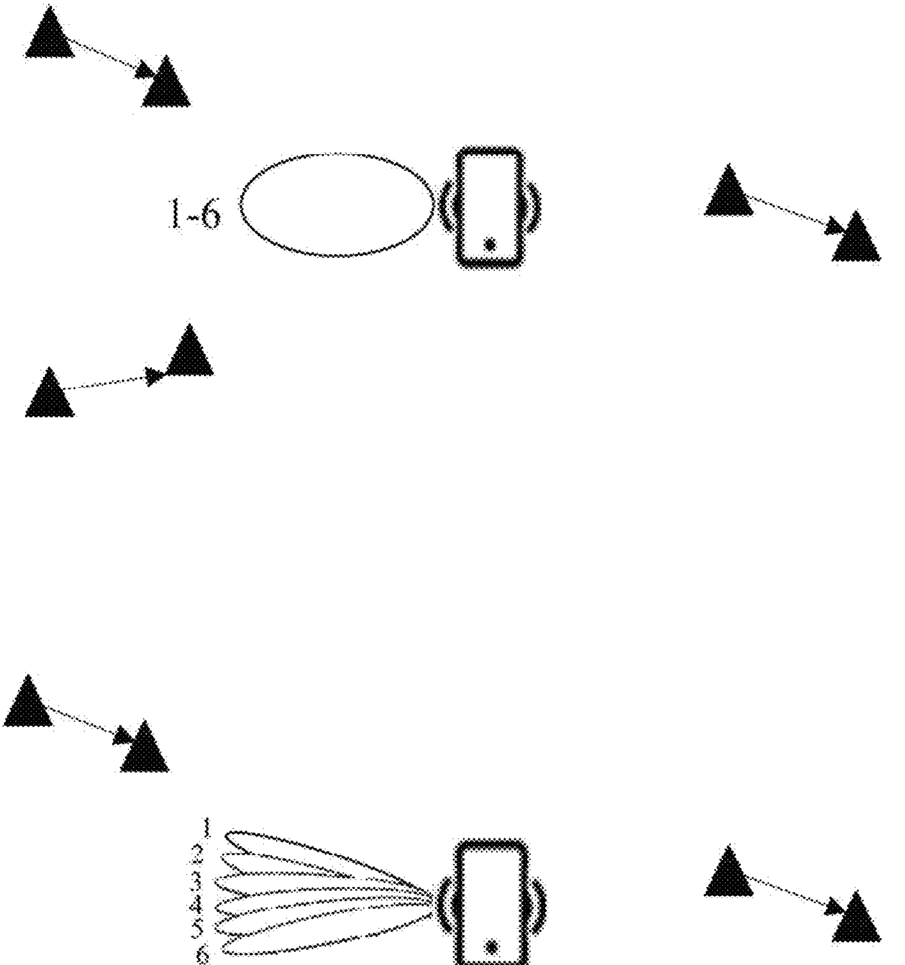

FIGS. 7A-7C illustrate example diagrams of a third use case of uplink reference signal beam configuration for uplink positioning according to embodiments of the present disclosure. Referring to FIG. 7A, the left half thereof illustrates one example of a first set of beams used by a user equipment. The SRS resource set of an SRS initial configuration of the user equipment includes a total of 6 SRS resources, which use beams 1-6 for uplink transmission respectively for a network device (located on the left side of the user equipment, not shown in the figure) to measure RSRP values of SRSs sent on the 6 beams.

According to FIG. 7A, there is a communication link of a hidden node within the coverage of beam 3-4, so the communication link of the hidden node has a serious impact on beam 3-4. In addition, there are two communication links of hidden nodes located within the reverse coverage of beams 1-2 and 5-6 of the user equipment as well, one of which has a transmission direction the same or close to the beam direction of beam 1-2, and another has a transmission direction the same or close to the beam direction of beams 5-6. Corresponding to the left half of FIG. 7A, the left half of FIG. 7B schematically illustrates the SRS transmission situation between the network device and the user equipment. Since SRSs sent on beams 3-4 are greatly interfered by collision with communication link of the hidden node, the RSRP measurement values of the SRSs sent in these two beam directions are almost 0. The sent on beams 1-2 and 5-6 are also interfered by the SRSs communication link of the hidden node to a certain extent, and corresponding SRS-RSRP values are all lower than the threshold M. According to the RSRP measurement value of the SRS in each beam direction, the network device may roughly infer that each uplink beam of the user equipment is greatly affected by the interference of the communication link of the hidden node, thereby determining that the uplink channel corresponding to the first set of beams indicated in the SRS initial configuration is in poor condition.

Additionally or alternatively, during measurement, the user equipment may perform an LBT operation before sending an SRS using a beam. For example, before sending SRSs on beams 3-4, the user equipment may fail to perform LBT, so the user equipment may choose not to send SRS. In this case, the network device does not receive the SRSs sent in the beam directions of beams 3-4, so the RSRP measurement values corresponding to the SRS may be recorded as 0.

It should be understood that although the user equipment has successfully performed LBT on beams 1-2, there is still a communication link of a hidden node that interferes with SRS transmission on beams 1-2, resulting in SRS transmission in these two beam directions suffers serious signal attenuation, so that the power reaching the network device is small. A similar situation exists for beams 5-6 also.

According to the present disclosure, in the third use case, the network device may instruct the user equipment to re-perform omnidirectional beam scanning. The right half of FIG. 7A and FIG. 7B respectively illustrate example diagrams of beams for omnidirectional scanning and corresponding SRS transmission situations. As shown, the network device has sent information instructing the user equipment to perform omnidirectional beam scanning to the user equipment, and then the user equipment perform omnidirectional beam scanning using beams 1'-6' pointing in various directions. It should be understood that the beam directions of beams 1'-6' used for omnidirectional scanning are usually different from that of beams 1-6 indicated in the SRS initial configuration. The RSRP measurement values of SRSs transmitted on beams 2', 4', 6' are almost 0 due to interference from communication links of hidden nodes (additionally or alternatively, the user equipment may fail to perform LBT before sending SRS on these beams, so the user equipment may choose not to send SRS failure. The network device does not receive the SRSs sent in these beam directions, so the RSRP measurement values corresponding to these SRSs may be recorded as 0). In addition, since there are communication links of hidden nodes within the reverse coverage of beams 1' and 3', and corresponding communication link transmission directions are the same or close to the beam transmission directions, the SRSs transmitted in these beam directions are interfered, thus the RSRP measurement values are less than the threshold M. The RSRP measurement value of the SRS sent on beam 5' is the highest among all SRS-RSRP measurement values, recorded as (SRS-RSRP) max', and the (SRS-RSRP) max'≥M.

Thereafter, a method similar to that in the first use case may be performed to update all beams (for example, beams 1'-4' and 6') with transmission quality metrics below the threshold in the beams used for omnidirectional beam scanning to beams with the same or close direction as the beam (for example, beam 5') with the highest transmission quality metric in the omnidirectional beam scan, thereby forming a second set of beams. FIG. 7C illustrates an example diagram of the updated second set of beams in the third use case. Since in this example, the RSRP measurement value of beam 5' meets uplink positioning performance requirements, beams 1-6 in the second set of beams are beams in the same direction as beam 5' (as shown in the upper half of FIG. 7C), or beams in close direction with beam 5' (for example, narrower uplink beams within the uplink beam coverage of beam 5', as shown in the lower half of FIG. 7C).

Similar to the first use case, in the third use case, the network device instructing the user equipment to use the second set of beams is achieved by sending SRS update configuration information. Similar to the initial configuration information of the SRS, the SRS update configuration information indicates a set of SSBs/CSI-RSs/PRSs that have QCL associations with the updated SRS (the second set of beams corresponds to the receive beams of the set of downlink reference signals, for sending SRS resources). As an example, but not a limitation, in the SRS update configuration information, the network device may use a bitmap to indicate which omnidirectional scanning beams need to be updated (switched), and the information may indicate which beam needs to be switched to.

After the SRS configuration is updated, the RSRP value of each SRS received by the network device is large enough, so the accuracy of uplink positioning may be improved.

Summary of Use Cases for SRS Update Configuration

To sum up, on the one hand, a network device instructs to a user equipment to send uplink reference signals to the network device for uplink positioning using a second set of beams through SRS update configuration information based at least on a transmission quality metric of an uplink reference signal sent in at least one beam direction of the first set of beams being lower than a threshold, indicated in an SRS initial configuration information (for example, the first use case, the third use case). On the other hand, the network device does not instruct the user equipment to use the second set of beams, based at least on transmission quality metrics of the uplink reference signals sent in all beam directions in the first set of beams being not lower than the above threshold, so that the user equipment continues to send uplink reference signals to the network device using the first set of beams for uplink positioning.

Therefore, in the present disclosure, in a case that channel conditions in some or all of beam directions indicated in an SRS initial configuration are poor, the beam directions for transmitting the SRSs are updated, so that transmit beams of the SRSs for uplink positioning can avoid or bypass interference from communication links of hidden nodes. As such, the transmission quality metric of the SRS received by the network device in each direction after the update is large enough, which improves the accuracy and reliability of uplink positioning.

It should be understood that the SRS initial configuration information (for example, including SRS initial default configuration information and SRS revise configuration information), SRS update configuration information, and global beam scanning indication information sent by the network device to the user equipment may all be transmitted through the DCI in the RRC or MAC-CE.

It should be appreciated that the specific example descriptions in the above use cases (including the first use case, the second use case, and the third use case) are only illustrative and are not intended to be limiting. In practice, there may be a plurality of user equipments and network devices. For each user equipment and each network device, beams in various examples may be measured and updated using the above method provided by the disclosure. It may be understood that in a case that the network device is a gNB and the gNB includes a plurality of transmission and reception points (TRPs), the above method may be used to measure and update beams between each user equipment and each TRP. It should also be appreciated that in practice there may be more or less beams and hidden nodes. The method provided according to the present disclosure can improve the uplink positioning performance under various channel conditions.

It should be understood that in the case of the first and third use cases, if the SRS-RSRP measurement values in a plurality of beam directions have reached the maximum value, then all beams with transmission quality metrics lower than the threshold may be updated to a beam randomly selected from the above plurality of beams, or all beam with transmission quality metrics lower than the threshold may be grouped and updated to multiple beams among the above plurality of beams.

Information Interaction

Figure 8A:
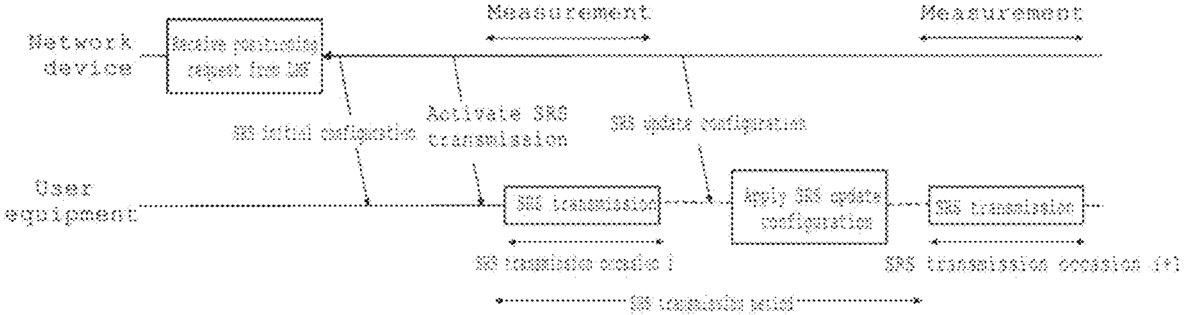
FIGS. 8A-8B illustrate a schematic diagram of information interaction for a beam configuration for uplink positioning of a wireless communication system according to an embodiment of the present disclosure.
Figure 8B:
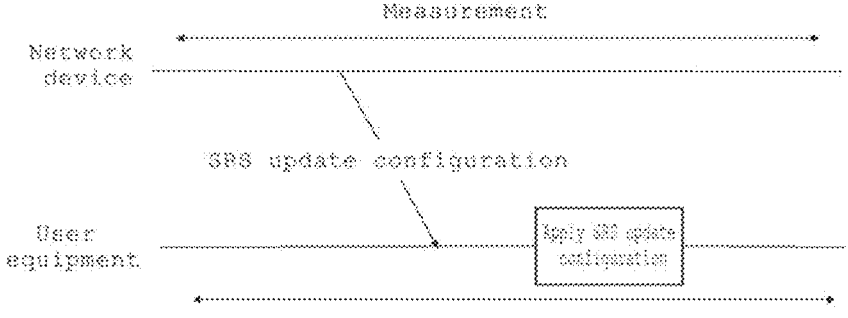

FIGS. 8A-8B illustrate a schematic diagram of information interaction for a beam configuration for uplink positioning of a wireless communication system according to an embodiment of the present disclosure.

As shown in FIG. 8A, after receiving a positioning request (e.g., NRPPa positioning request) from a location management function entity (LMF), a network device may send SRS initial configuration information to a user equipment. As mentioned above, the SRS initial configuration information may include SRS initial default configuration information and SRS revise configuration information (for example, in a case that the user equipment has performed previous downlink reference signal measurement or training, it may be performed revise configuration after the SRS initial default configuration). The network device may then instruct to the user equipment to activate SRS transmission.

According to a spatial relationship specified in the SRS initial configuration (for example, specifying a set of downlink reference signals with QCL association with SRSs), a user equipment may use beams specified in the SRS initial configuration as uplink beams (also referred to as "a first set of beams") to transmit SRSs. Specifically, the user equipment may send an SRS to a network device in each beam direction of the first set of beams. Accordingly, the network device may measure transmission quality metrics of SRSs sent in each beam direction of the first set of beams.

The network device may not send any SRS update configuration information to the user equipment at least in a case that it determines that transmission quality metrics of uplink reference signals sent in all beam directions in a first set of beams are not lower than a threshold (indicating that uplink channels in all beam directions in the first set of beams are in good condition), so that the user equipment continues to use the first set of beams to send SRSs to the network device for uplink positioning (specific examples have been described in detail in the aforementioned second use case).

The network device send SRS update configuration information to the user equipment at least in a case that it determines that a transmission quality metric of an uplink reference signal sent in at least one beam direction in a first set of beams is lower than a threshold (indicating that uplink channels in some or all beam directions in the first set of beams are in poor condition). In a case that the user equipment receives SRS configuration update information from the network device, the user equipment may apply the SRS update configuration and perform SRS transmission for uplink positioning. As an example, the user equipment may perform SRS transmission using beams specified in the SRS update configuration as uplink beams (herein, also referred to as "a second set of beams") according to the spatial relationship specified in the SRS update configuration (for example, specifying an updated set of downlink reference signals with QCL association with SRSs) for uplink positioning.

More subdivided, a transmission quality metric of an uplink reference signal sent in at least one beam direction of the first set of beams being lower than a threshold may be divided into the following two cases: (1) a transmission quality metric of an uplink reference signal sent in at least one beam direction of the first set of beams is lower than the threshold and a transmission quality metric of an SRS sent in at least one other beam direction of the first set of beams is not lower than the threshold; and (2) transmission quality metrics of SRSs sent in all beam directions of the first set of beams are below the threshold.

In case (1), the network device may update all beams in the first set of beams whose transmission quality metric is lower than the threshold to beams with the same or close beam direction as the beam with the highest transmission quality metric in the first set of beams, thereby forming a second set of beams (specific examples have been described in detail in the aforementioned first use case). In case (2), the network device may instruct the user equipment to re-perform omnidirectional beam scanning, and update all beams in the beams used for omnidirectional beam scanning with transmission quality metrics lower than the threshold to beams with the same or close beam direction as the beam with the highest transmission quality metric in the omnidirectional beam scanning, thereby forming a second set of beams (specific examples have been described in detail in the aforementioned third use case).

It should be understood that the transmission of SRS update configuration information may occur between two SRS transmission occasions, as shown in FIG. 8A. Considering long latency between SRS transmission and measurement, the transmission of SRS update configuration information may also occur during a certain SRS transmission, as shown in FIG. 8B (for ease of explanation, FIG. 8B omits other steps in FIG. 8A (including but not limited to transmission of SRS initial configuration information, activation of SRS transmission, etc.)). According to FIG. 8B, within one SRS transmission latency, if a user equipment receives SRS update configuration information from a network device, the user equipment may immediately apply the update configuration and transmit updated SRS resources and not yet transmitted SRS resources using the second set of beams.

It should also be understood that high-level parameter configurations for a SRS resource set may include time domain type configuration, which includes "periodic" type, "semi-persistent" type, and "aperiodic" type. The transmission interaction mechanism in FIG. 8A may be applied to SRS resource sets of the "periodic" type or the "semi-persistent" type, while the transmission interaction mechanism in FIG. 8B may be applied to SRS resource sets of the "periodic" type, the "semi-persistent" type or the "aperiodic" type.

It should be noted that the information interaction diagrams in FIGS. 8A-8B merely provide examples and are not intended to be limiting. The figures may contain more or fewer steps and the steps may also be performed in a different order than that depicted in the figures.

According to the method for uplink reference signal (for example, SRS) transmission beam configuration in positioning proposed by the present disclosure, when a network device finds out through measuring that channels in beam directions of some or all of uplink beams for transmitting SRSs are in poor condition, it can infer that these beam directions are interfered by communication links of hidden nodes, thereby instructing a user equipment to update uplink transmit beams used to transmit SRSs by indicating a spatial relationship update. The SRS update configuration mechanism provided by the present disclosure may enable transmit beams of the user equipment for transmitting SRSs to quickly and effectively avoid interference from communication links of hidden nodes, thereby improving the accuracy and reliability of uplink positioning under various channel conditions.

<Power Configuration in SRS Transmission for Positioning>

The present disclosure proposes a transmission power configuration for uplink reference signals for uplink positioning, wherein transmission power of uplink reference signals is set and adjusted, thereby improving the accuracy and reliability of uplink positioning. It should be understood that the SRS transmission power configuration for positioning and the SRS transmission beam configuration for positioning may be used in combination or alternatively.

Referring to FIG. 1 again, a cell in which the network device 101 provides services to the user equipment 102 is called a serving cell, and cells near the serving cell are called neighbor cells. The serving cell and neighbor cells may be, for example, cellular cells, small cells, micro cells, femto cells, etc. Herein, for user equipments, a network device in the serving cell is also called a serving network device, and a network device in the neighbor cell is also called a neighbor network device.

In the current wireless communication system, a user equipment may report downlink measurement results (for example, measurement results (such as path loss, etc.) of downlink reference signals (such as SSB/CSI-RS/PRS)) of a serving network device to the serving network device, and the serving network device will perform transmission power configuration for uplink reference signals (for example, SRSs) for uplink positioning for the user equipment. However, since the above transmission power configuration is only based on the downlink measurement results of the serving cell, it is likely to be inapplicable to network devices in neighbor cells. In general, the distance between a neighbor network device and a user equipment is further than that of a serving network device. Therefore, it is likely to make the power of SRS resources received by the neighbor network device too small according to the current transmission power configuration, resulting in corresponding transmission quality metrics (for example, SRS-RSRP) too low to meet the performance of uplink positioning. According to an embodiment of the present disclosure, it is preferable to perform transmission power configuration on user equipment respectively for different network devices to adapt to transmission channels with different transmission distances and path losses.

Not only that, as mentioned earlier, in high-frequency band systems such as unlicensed millimeter wave systems, due to a large number of devices using different RATs and the inevitable long latency during SRS transmission, the problem of hidden node interference is more serious, thus making the change of channel state of each SRS resource for uplink positioning relatively random and difficult to predict. Therefore, the current method of perform transmission power configuration collectively for an SRS resource set is no longer applicable. According to an embodiment of the present disclosure, it is preferred that each SRS resource in the SRS resource set is performed transmission power configuration separately and adjusted in real time to adapt to randomly changing channel conditions.

SRS Power Initial Configuration

FIG. 9 illustrates a schematic diagram of information interaction for a power initial configuration for uplink positioning of a wireless communication system according to an embodiment of the present disclosure. As shown in FIG. 9, a location management function entity (LMF) sends a positioning request (e.g., NRPPa positioning activation request) to a serving network device and receives a positioning response (e.g., NRPPa positioning activation response) from the serving network device. Afterwards, the LMF may send measurement requests (e.g., NRPPa measurement requests) to various network devices (including the serving network device and neighbor network devices). Different from current wireless communication systems which only perform statistics on downlink measurement results of the serving network device, according to the embodiment of the present disclosure, each network device performs statistics on uplink measurement results, and neighbor network devices may (for example, via Xn interface) send their uplink measurements to the serving network device. Based on statistical information of the uplink measurement results of each network device, the serving network device may set a corresponding transmission power configuration for each SRS resource of a user equipment in the serving cell. This transmission power configuration may be indicated by a TPC (Transmission Power Control) command field in a higher-level parameter. It should be understood that one TCP field may correspond to one SRS Resource Index (SRI). The TCP command may be sent by the serving network device to the user equipment together with a message activating SRS transmission for uplink positioning.

It should be understood that, for ease of explanation, FIG. 9 only illustrates an example of one serving network device and one neighbor network device. In practice, there may be a larger number of serving network devices and/or neighbor network devices. A plurality of neighbor network devices may send their own uplink measurement results to one serving network device, or they may be grouped collectively (for example, each group includes one or more neighbor network devices corresponding to one serving network device, and the standard for grouping may be based on distances between network devices, etc.) and then send those results to corresponding serving network devices.

As mentioned above, the power initial configuration for SRS resources for uplink positioning of the user equipment may be based on uplink measurement results regarding the SRS resources of individual network devices and the user equipment collected by the serving network device. According to embodiments of the present disclosure, The following is a configuration example of an initial power $P_{SRS\text{-}pos}$ (in dBm) of SRS resources of a user equipment:

$$P_{SRS-pos} = \min\{P_{max}, P_o + A \cdot PL(q_d)\}\ [\text{dBm}] \tag{1}$$

Wherein, $P_{max}$ is the maximum transmission power of the user equipment; $P_o$ is a reference power set value; A is an influence factor of uplink path loss estimation; $PL(q_d)$ is an uplink path loss estimation result obtained based on uplink measurement result; $q_d$ is the index of a reference signal resource for uplink path loss estimation. All of these parameters may be associated with the carrier, frequency band of the SRS resource, and the number of resource blocks (RBs) occupied by the bandwidth where the SRS resource is located.

It should be noted that, for a SRS resource for uplink positioning sent by a user equipment to a neighbor network device, the corresponding $PL(q_d)$ in its power initial configuration is a path loss result in previous uplink measurement regarding the SRS resource of the user equipment and the neighbor network device (the uplink path loss result has been reported to a serving network device).

Optionally, in addition to performing SRS power initial configuration by a serving network device to a user equipment based on uplink measurement results of individual network devices, the SRS power initial configuration may also be performed by the user equipment based on previous downlink measurement results with individual network devices (for a configuration example, refer to equation (1), wherein $PL(q_d)$ represents a path loss result in a downlink measurement corresponding to an SRS resource). Although the accuracy of the latter is not as good as the former, the operation is simple and fast, and the downlink measurement results also have reference significance for the transmission of uplink reference signals to a certain extent.

SRS Power Update Configuration

According to an embodiment of the present disclosure, after a serving network device instructs to a user equipment an SRS power initial configuration for one or more network devices (including serving network devices and neighbor network devices), the user equipment sends SRS resources to corresponding network devices for uplink positioning using the instructed power value therein (optionally, the user equipment may also determine its own initial power value based on downlink measurement results with one or more network devices). Thereafter, due to large SRS transmission latency in unlicensed millimeter wave frequency bands, channel state has changed greatly during this period, resulting in serious problems such as hidden node link interference. According to an embodiment of the present disclosure, there is proposed a power update configuration for SRS resources, allowing the SRS transmission power of user equipment to be adjusted to better adapt to dynamic channel condition changes. For ease of explanation, the following takes SRS resource transmission for uplink positioning between user equipment and serving network device as an example to describe the power update configuration for specific SRS resources.

According to an embodiment of the present disclosure, a user equipment may perform a listen-before-talk (LBT) operation before transmitting an SRS resource to a network device, and then transmit the SRS resource after the LBT operation is successful. The user equipment may compare the interference power measured in the LBT operation with a threshold to obtain auxiliary information, which may be used for power update configuration of SRS transmission for uplink positioning. As an example, the auxiliary information may be represented by 1 bit. The specific information thereof is as follows:

TABLE 1

| Auxiliary information | | |
|---|---|---|
| Channel Condition | LBT result | Auxiliary Information |
| Good | interference power ≤ LQT | 0 |
| Medium | LQT < interference power < EDT | 1 |
| Poor | EDT ≤ interference power | NULL |

wherein, the threshold includes link quality threshold (LQT) and energy detection threshold (EDT). LQT may be a threshold set by the network device based on the latest uplink measurement result, which represents the tolerable interference power under the current transmission power. EDT may represent the intolerable interference power under the current transmission power. In some examples, EDT may be associated with the maximum transmission power and effective antenna gain of a user equipment. Therefore, EDT is greater than LQT. It should be understood that LOT and EDT may be sent by a network device to a user equipment through a higher-level parameter (DCI in RRC or MAC-CE).

As shown in Table 1, during the LBT process of a user equipment, if a small interference power (for example, interference power≤LQT) is detected, it means that the channel condition is good, and the auxiliary information is represented by “0”. In this case, it may be determined that the user equipment is hardly interfered with, and its measured interference power is basically consistent with the previous uplink measurement result of the network device. If a medium interference power (for example, LQT<interference power<EDT) is detected during the LBT process, it means that the channel condition is medium, and the auxiliary information is represented by “1”. In this case, the uplink transmission link of the user equipment may have been interfered by communication links of hidden nodes, but the network device may not have perceived the interference yet (for example, as shown in FIG. 1). If a large interference power (for example, interference power≥EDT) is detected during the LBT process, it means that the channel condition is poor and the auxiliary information is “NULL”. In this case, there is a high probability that there are obvious interfering nodes within the SRS uplink beam coverage of the user equipment, and the user equipment may not send corresponding SRS resources. It should be understood that when the auxiliary information is “0” or “1”, the LBT operation succeeds, otherwise the LBT operation may fail. The user equipment may send the determined auxiliary information along with the SRS resource to the network device.

Figure 10A:
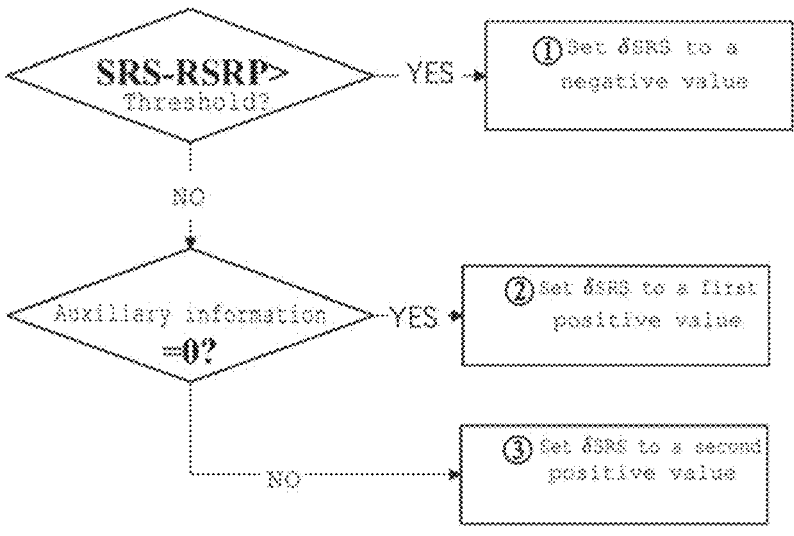
FIGS. 10A-10B illustrate flowcharts for power adjustment of a wireless communication system according to embodiments of the present disclosure.
Figure 10B:
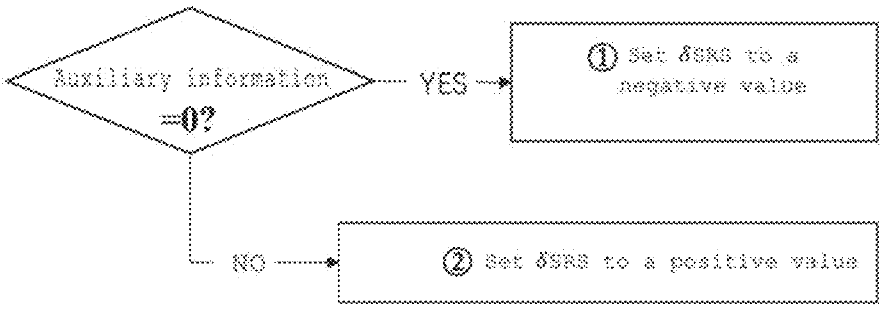

The network device may perform transmission power update configuration on the SRS resource based at least on the auxiliary information from the user equipment (power update is also referred to as power adjustment herein). FIGS. 10A and 10B illustrate example flowcharts for power adjustment.

As shown in FIG. 10A, the network device determines the transmission power adjustment value of the SRS resource (herein, also labelled as “SSRS”, in dB) based on the transmission quality metrics (for example, “SRS-RSRP”) and auxiliary information of the SRS resource recorded during the measurement process, wherein the SRS-RSRP has a higher priority than the auxiliary information. Specifically, the network device first compares the SRS-RSRP measurement value to a specific threshold. If the SRS-RSRP value is higher than the specific threshold, it indicates that the channel condition of the SRS resource is very good, then the network device may instruct the user equipment to appropriately reduce the transmission power, that is, set the SSRS to a negative value. If the SRS-RSRP value is not higher than the specific threshold, the network device may determine whether the auxiliary information reported by the user equipment is “0”. If the auxiliary information is “0”, it indicates that although the signal condition is not particularly good, it is not too poor either (e.g., no obvious hidden node link interference). In this case, the network device may instruct the user equipment to increase the transmission power a little, that is, set the SSRS to a first positive value. Otherwise, if the network device receives the auxiliary information of “1”, it indicates that the channel condition is poor, then the network device may instruct the user equipment to further increase the transmission power to avoid interference by communication links of hidden nodes. In this case, the SSRS may be set to a second positive value, where the second positive value is greater than the first positive value.

Since the SRS resource set may include a large number of SRS resources, the network device measuring the SRS-RSRP value of each SRS resource may cause excessive implementation complexity and power consumption on the network device side. This phenomenon is particularly obvious in scenarios with dense user equipments (for example, there are a large number of user equipments for uplink positioning). Therefore, in order to reduce the implementation complexity and power consumption on the network device side, the step of measuring SRS-RSRP and comparing it with the threshold may be omitted. As shown in FIG. 10B, the network device may perform power update configuration based only on the auxiliary information reported by the user equipment. Specifically, when the auxiliary information is "0", the network device may instruct the user equipment to appropriately reduce the transmission power of the SRS resource, that is, set the SSRS to a negative value; otherwise, when the auxiliary information is "1", the network device may instruct the user equipment to appropriately increase the transmission power of the SRS resource, that is, set the SSRS to a positive value. It should be understood that in another embodiment, in order to further improve the performance of uplink positioning, when the auxiliary information is "0", the network device may also instruct to the user equipment that the SSRS is 0 or a small positive value, and in other situations, instruct to the user equipment that the SSRS is a large positive value. It should be understood that the SSRS may be indicated in a TPC instruction. In some cases, the field length of a TPC instruction (e.g., the number of bits occupied by the field) may be limited in order to save transmission overhead. Therefore, the TPC field may include several adjustment values based on current user equipment power, such as adjusting +1 dB, +4 dB, −1 dB, etc. on the basis of the current power.

Figure 11:
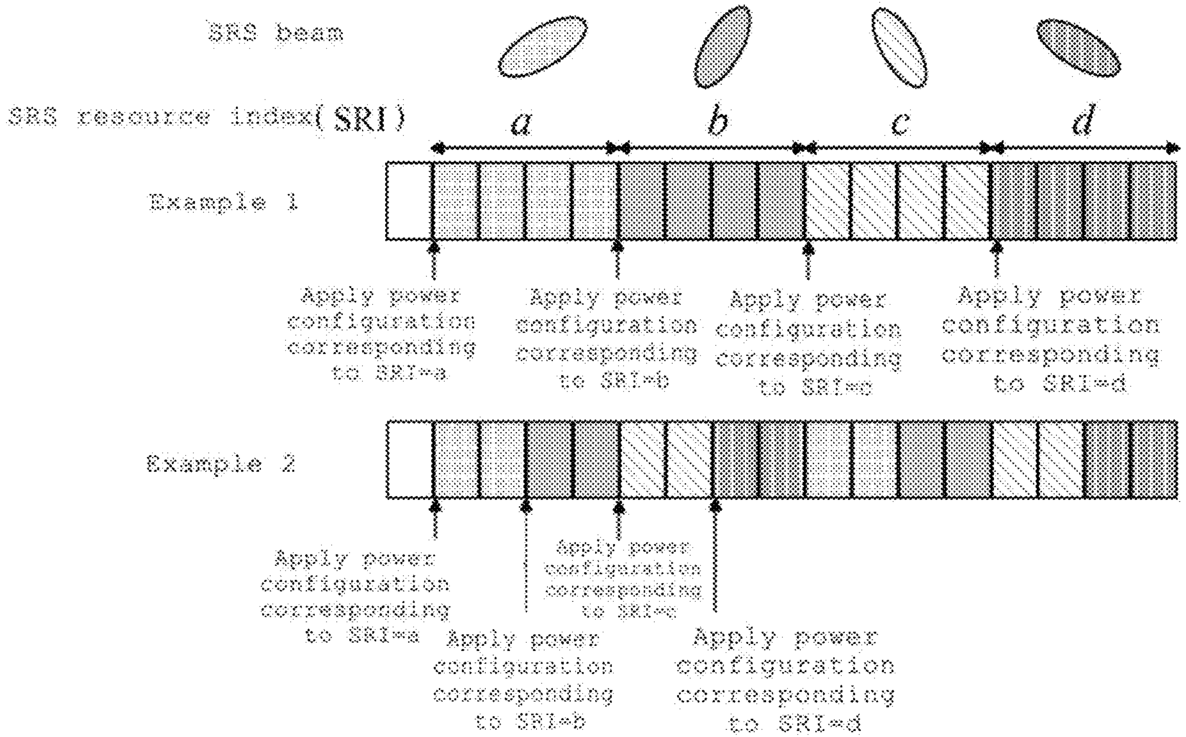
FIG. 11 illustrates an example diagram of a power configuration for uplink reference signals according to an embodiment of the present disclosure.

It should be understood that since one TCP field may correspond to one SRS resource index (SRI), power configuration on the user equipment side occurs before the transmission of each SRS resource in an SRS resource set. As shown in FIG. 11, unlike traditional wireless communication systems in which the same transmission power is configured for all SRS resources in an SRS resource set, in embodiments of the present disclosure, corresponding power configuration is performed for each SRS resource (for example, each SRS resource corresponds to a specific uplink transmit beam). FIG. 11 illustrates an example of two transmission sequences of SRS resources in a SRS resource set, but is not intended to be limiting. In practice, as the repetition parameter and time gap parameter of the SRS resources change, there are also a plurality of transmission sequences of the SRS resources. In the transmission of SRS resources in different sequences, the power of each SRS resource may be configured before transmission. It should be noted that in one SRS transmission occasion, the user equipment may receive multiple TPC instructions for the same network device and the same SRS resource. In the next SRS transmission occasion, the user may use the cumulative sum of multiple power adjustment values (in dB) indicated in multiple previously received TPC instructions as the actual power adjustment value.

It should be appreciated that if a neighbor network device wishes to perform power update configuration on a specific SRS resource of a user equipment, the neighbor network device may obtain a power adjustment value according to the above method of the present disclosure, and include a recommended power adjustment value in a power update request (for example, via Xn interface) and send it to a serving network device. Then, the serving network device may use, for example, the method shown in FIG. 11 to perform power adjustment on the specific SRS resource of the user equipment. Optionally, the serving network device may also receive uplink measurement result and auxiliary information from the neighbor network device, and determine the SRS transmission power adjustment value for the user equipment to perform uplink positioning to the neighbor network device based on these information.

It should be understood that the transmission power configuration of SRS resources (including power initial configuration and power update configuration) may be transmitted through TPC instructions, wherein the TPC instructions may be transmitted through RRC DCI or through MAC-CE.

Trade-Off Between Power Consumption and Signaling Overhead

According to an embodiment of the present disclosure, in a case that the number of users performing SRS transmission is too large and causing the signaling overhead for power adjustment too large, the process (1) in FIGS. 10A and 10B may be omitted. In a case that the power loss of a specific user equipment is too large, the process (1) in FIGS. 10A and 10B may be required to be enforced (and wherein the SSRS is a negative value).

In addition, according to an embodiment of the present disclosure, when power adjustment values for a plurality of SRS resources are the same or similar, one TPC field may be associated with multiple SRIs, wherein the power adjustment value indicated in the TPC field may be the mode of the power adjustment values for these SRS resources.

According to the method for uplink reference signal (for example, SRS) transmission power configuration in positioning proposed by the present disclosure, a serving network device can perform SRS power initial configuration on a user equipment in the serving cell based on uplink measurement results of itself and neighbor network devices (or the user equipment determines corresponding SRS power initial configuration based on downlink measurement results of individual network devices), so that the reception quality of SRS resources detected by network devices located in different geographical locations may be maintained within a reasonable range. In addition, the network device can adjust the transmission power of SRS resources in real time based at least on auxiliary information received from the user equipment, thereby reducing the interference effect of hidden nodes on the transmission of specific SRS resources, better adapting to various channel conditions, and improving the accuracy and effectiveness of uplink positioning. Furthermore, the method proposed in the disclosure balances the power and overhead of user equipment on the premise of satisfying uplink positioning performance.

EXEMPLARY METHOD

Figure 12:
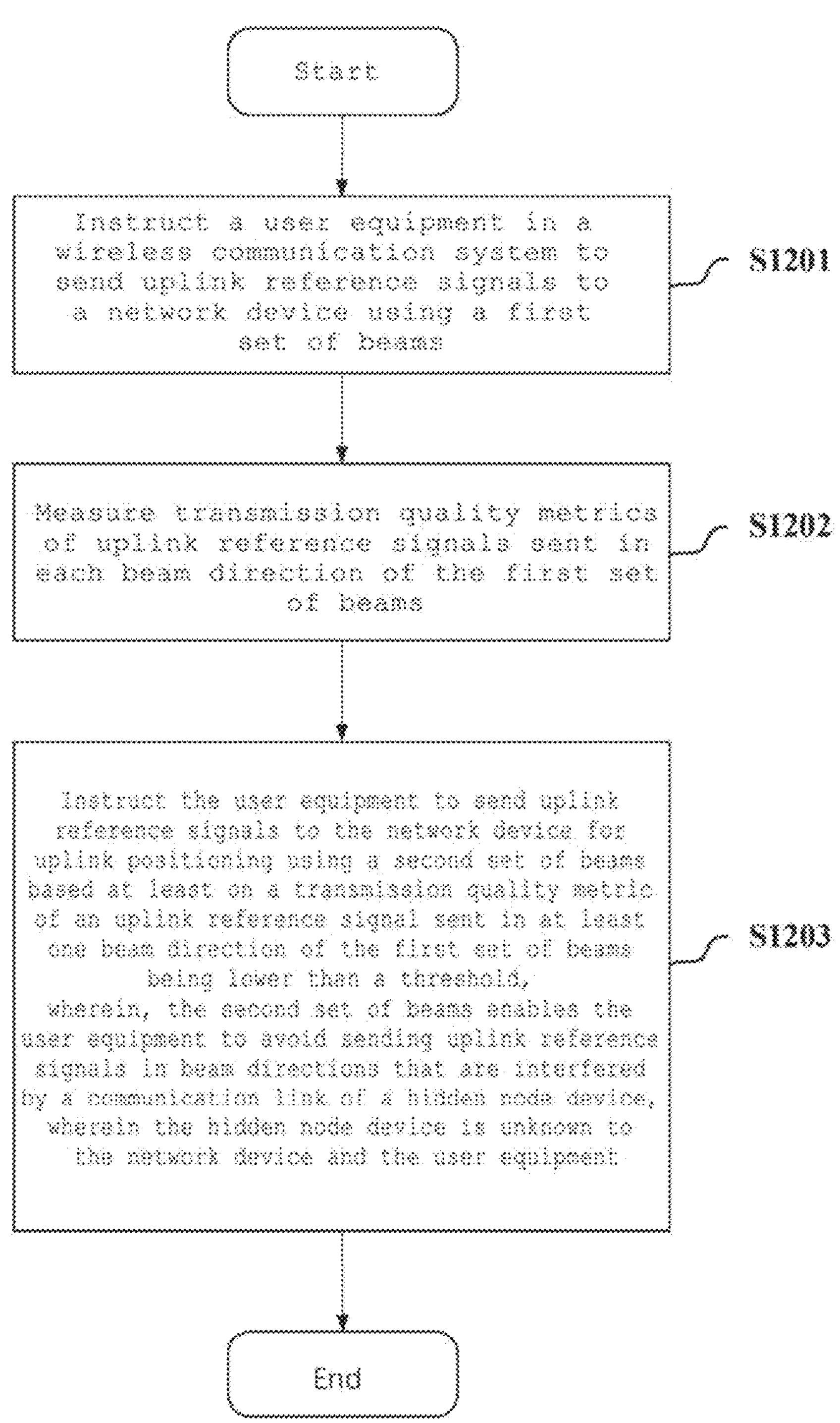
FIG. 12 illustrates a flowchart of an example method for a network device in a wireless communication system according to an embodiment of the present disclosure.

FIG. 12 illustrates a flowchart of an example method for a network device (or, more specifically, an electronic device 200) in a wireless communication system according to an embodiment of the present disclosure. As shown in FIG. 12, the method may include instructing a user equipment in a wireless communication system to send uplink reference signals to the network device using a first set of beams (block S1201). At block S1202, the network device may measure transmission quality metrics of the uplink reference signals sent in each beam direction of the first set of beams. Thereafter, the network device may instruct the user equipment to send uplink reference signals to the network device for uplink positioning using a second set of beams, based at least on a transmission quality metric of an uplink reference signal sent in at least one beam direction of the first set of beams being lower than a threshold (block 1203). In this method, the second set of beams may enable the user equipment to avoid sending uplink reference signals in beam directions that are interfered by a communication link of a hidden node device, wherein the hidden node device may be unknown to the network device and the user equipment. For detailed example operations of this method, reference may be made to the above operation description regarding the network device (or more specifically, the electronic device 200), which will not be repeated here.

Additionally or alternatively, the network device used in the wireless communication system may instruct to the user equipment transmission power configuration for uplink reference signals for uplink positioning based on uplink measurement results and/or auxiliary information reported by the user equipment.

Figure 13:
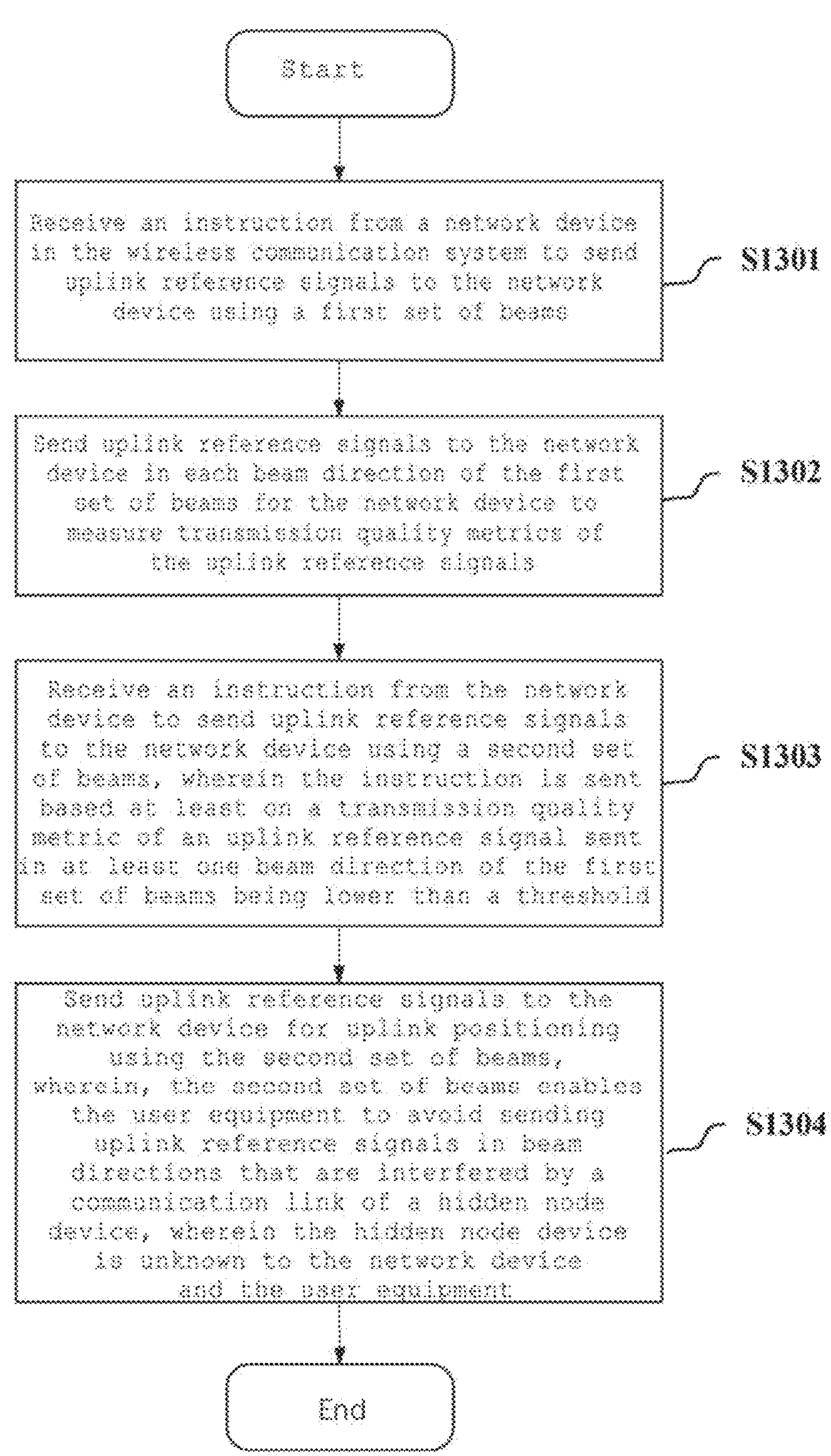
FIG. 13 illustrates a flowchart of an example method for a user equipment in a wireless communication system according to an embodiment of the present disclosure.

FIG. 13 illustrates a flowchart of an example method for a user equipment (or more specifically, an electronic device 300) in a wireless communication system according to an embodiment of the present disclosure. As shown in FIG. 13, the method may include receiving an instruction from a network device in a wireless communication system to send uplink reference signals to the network device using a first set of beams (block S1301). At block S1302, the user equipment may send uplink reference signals to the network device in each beam direction of the first set of beams for the network device to measure transmission quality metrics of the uplink reference signals. The user equipment may receive an instruction from the network device to send uplink reference signals to the network device using a second set of beams, wherein the instruction is sent based at least on a transmission quality metric of an uplink reference signal sent in at least one beam direction of the first set of beams being lower than a threshold (block 1303). Thereafter, at block 1304, the user equipment may send uplink reference signals to the network device for uplink positioning using a second set of beams. In this method, the second set of beams may enable the user equipment to avoid sending uplink reference signals in beam directions that are interfered by a communication link of a hidden node device, wherein the hidden node device may be unknown to the network device and the user equipment. For detailed example operations of this method, reference may be made to the above operation description of the user equipment (or more specifically, the electronic device 300), which will not be repeated here.

Additionally or alternatively, the user equipment used in the wireless communication system may use corresponding power to transmit uplink reference signals to the network device for uplink positioning based on transmission power configuration for the network device. Wherein, the transmission power configuration is based at least on uplink measurement results of the network device and/or auxiliary information received by the network device from the user equipment.

The solution of the present disclosure may be implemented in the following exemplary ways.

Clause 1. A network device in a wireless communication system, the network device comprising a processing circuit configured to cause the network device to perform the following operations:

instructing a user equipment in the wireless communication system to send uplink reference signals to the network device using a first set of beams;

measuring transmission quality metrics of the uplink reference signals sent in each beam direction of the first set of beams; and instructing the user equipment to send uplink reference signals to the network device for uplink positioning using a second set of beams based at least on a transmission quality metric of an uplink reference signal sent in at least one beam direction of the first set of beams being lower than a threshold, wherein, the second set of beams enables the user equipment to avoid sending uplink reference signals in beam directions that are interfered by a communication link of a hidden node device, wherein the hidden node device is unknown to the network device and the user equipment.

Clause 2. The network device according to Clause 1, wherein the uplink reference signals include sounding reference signal (SRS).

Clause 3. The network device according to Clause 2, wherein the instructing of beam directions of the uplink reference signals is achieved by instructing downlink reference signals having a quasi-co-located (QCL) association with the uplink reference signals, wherein the downlink reference signals include synchronization signal block (SSB), channel state information reference signal (CSI-RS), and/or positioning reference signal (PRS).

Clause 4. The network device according to Clause 1, the processing circuit is further configured to cause the network device to perform the following operation:

at least in response to a transmission quality metric of an uplink reference signal sent in at least one beam direction of the first set of beams being lower than the threshold and a transmission quality metric of an uplink reference signal sent in at least one other beam direction of the first set of beams being not lower than the threshold, updating all beams in the first set of beams whose transmission quality metric is lower than the threshold to beams with the same or close beam direction as the beam with the highest transmission quality metric in the first set of beams, thereby forming a second set of beams.

Clause 5. The network device according to Clause 1, the processing circuit is further configured to cause the network device to perform the following operation:

at least in response to transmission quality metrics of the uplink reference signals sent in all beam directions in the first set of beams being lower than the threshold, instructing the user equipment to re-perform omni-directional beam scanning, and updating all beams in the beams for omni-directional beam scanning with transmission quality metric lower than the threshold to beams with the same or close beam direction as the beam with the highest transmission quality metric in omni-directional beam scanning, thereby forming a second set of beams.

Clause 6. The network device according to Clause 1, the processing circuit is further configured to cause the network device to perform the following operation:

based at least on the transmission quality metrics of the uplink reference signals sent in all beam directions in the first set of beams being not lower than the threshold, not instructing the user equipment to use the second set of beams, so that the user equipment continues to use the first set of beams to send uplink reference signals to the network device for uplink positioning.

Clause 7. The network device according to Clause 1, wherein the instruction to the user equipment to use the first set of beams is transmitted in one of:

uplink reference signal initial default configuration information sent by the network device to the user equipment; or uplink reference signal revise configuration information sent by the network device to the user equipment based on the latest downlink reference signal measurement result.

Clause 8. The network device according to Clause 1, wherein the network device, the user equipment and the hidden node device operate in an unlicensed millimeter wave frequency band.

Clause 9. The network device according to Clause 1, wherein the transmission quality metric includes one of the following or a combination of a plurality of the following: reference signal received power (RSRP), reference signal received quality (RSRQ), signal to interference plus noise ratio (SINR), or decoding rate.

Clause 10. The network device according to Clause 1, wherein, instructing the user equipment to use the first set of beams and instructing the user equipment to use the second set of beams through downlink control information (DCI) in a radio resource control (RRC) information element or through a medium access control (MAC)-control element (CE).

Clause 11. The network device according to Clause 1, wherein the beam direction of the user equipment for sending the uplink reference signals being interfered by a communication link of a hidden node device includes: the hidden node device being located within the coverage of the beam direction; or the hidden node device being located within the reverse coverage of the beam direction and the transmission direction of the communication link of the hidden node device being the same or close to the beam direction.

Clause 12. A user equipment in a wireless communication system, the user equipment comprising a processing circuit configured to cause the user equipment to perform the following operations:

receiving an instruction from a network device in the wireless communication system to send uplink reference signals to the network device using a first set of beams;

sending uplink reference signals to the network device in each beam direction of the first set of beams for the network device to measure transmission quality metrics of the uplink reference signals;

receiving an instruction from the network device to send uplink reference signals to the network device using a second set of beams, wherein the instruction is sent based at least on a transmission quality metric of an uplink reference signal sent in at least one beam direction of the first set of beams being lower than a threshold; and sending uplink reference signals to the network device for uplink positioning using the second set of beams, wherein, the second set of beams enables the user equipment to avoid sending uplink reference signals in beam directions that are interfered by a communication link of a hidden node device, wherein the hidden node device is unknown to the network device and the user equipment.

Clause 13. The user equipment according to Clause 12, wherein the uplink reference signals include sounding reference signal (SRS).

Clause 14. The user equipment according to Clause 13, wherein the instructing of beam directions of the uplink reference signals is achieved by instructing downlink reference signals having a quasi-co-located (QCL) association with the uplink reference signals, wherein the downlink reference signals include synchronization signal block (SSB), channel state information reference signal (CSI-RS), and/or positioning reference signal (PRS).

Clause 15. The user equipment according to Clause 12, wherein:

at least in a case that a transmission quality metric of an uplink reference signal sent in at least one beam direction of the first set of beams is lower than the threshold and a transmission quality metric of an uplink reference signal sent in at least one other beam direction of the first set of beams is not lower than the threshold, all beams in the first set of beams whose transmission quality metric is lower than the threshold are updated to beams with the same or close beam direction as the beam with the highest transmission quality metric in the first set of beams, thereby forming a second set of beams.

Clause 16. The user equipment according to Clause 12, wherein:

at least in a case that transmission quality metrics of the uplink reference signals sent in all beam directions in the first set of beams are lower than the threshold, the user equipment re-performs omni-directional beam scanning, and all beams in the beams for omni-directional beam scanning with transmission quality metric lower than the threshold are updated to beams with the same or close beam direction as the beam with the highest transmission quality metric in the omnidirectional beam scanning, thereby forming a second set of beams.

Clause 17. The user equipment according to Clause 12, wherein:

at least in a case that transmission quality metrics of the uplink reference signals sent in all beam directions in the first set of beams is not lower than the threshold, the user equipment continues to use the first set of beams to send uplink reference signals to the network device for uplink positioning.

Clause 18. The user equipment according to Clause 12, wherein the instruction to use the first set of beams is transmitted in one of:

uplink reference signal initial default configuration information received by the user equipment from the network device; or uplink reference signal revise configuration information received by the user equipment from the network device, which is sent based on the latest downlink reference signal measurement result of the network device.

Clause 19. The user equipment according to Clause 12, wherein the network device, the user equipment and the hidden node device operate in an unlicensed millimeter wave frequency band.

Clause 20. The user equipment according to Clause 12, wherein the transmission quality metric includes one of the following or a combination of a plurality of the following: reference signal received power (RSRP), reference signal received quality (RSRQ), signal to interference plus noise ratio (SINR), or decoding rate.

Clause 21. The user equipment according to Clause 12, wherein, the user equipment receives an instruction to use the first set of beams and an instruction to use the second set of beams through downlink control information (DCI) in a radio resource control (RRC) information element or through a medium access control (MAC)-control element (CE).

Clause 22. A method for a network device in a wireless communication system, the method comprising:

instructing a user equipment in the wireless communication system to send uplink reference signals to the network device using a first set of beams;

measuring transmission quality metrics of the uplink reference signals sent in each beam direction of the first set of beams; and instructing the user equipment to send uplink reference signals to the network device for uplink positioning using a second set of beams based at least on a transmission quality metric of an uplink reference signal sent in at least one beam direction of the first set of beams being lower than a threshold, wherein, the second set of beams enables the user equipment to avoid sending uplink reference signals in beam directions that are interfered by a communication link of a hidden node device, wherein the hidden node device is unknown to the network device and the user equipment.

Clause 23. A method for a user equipment in a wireless communication system, the method comprising:

receiving an instruction from a network device in the wireless communication system to send uplink reference signals to the network device using a first set of beams;

sending uplink reference signals to the network device in each beam direction of the first set of beams for the network device to measure transmission quality metrics of the uplink reference signals;

receiving an instruction from the network device to send uplink reference signals to the network device using a second set of beams, wherein the instruction is sent based at least on a transmission quality metric of an uplink reference signal sent in at least one beam direction of the first set of beams being lower than a threshold; and sending uplink reference signals to the network device for uplink positioning using a second set of beams, wherein, the second set of beams enables the user equipment to avoid sending uplink reference signals in beam directions that are interfered by a communication link of a hidden node device, wherein the hidden node device is unknown to the network device and the user equipment.

Clause 24. A computer-readable storage medium having one or more instructions stored thereon, which, when executed by one or more processors of an electronic device, cause the electronic device to perform the method according to Clause 22 or 23.

Clause 25. A computer program product comprising program instructions, which, when executed by one or more processors of a computer, cause the computer to perform the method according to Clause 22 or 23.

It should be noted that the application examples described above are merely exemplary. The embodiments of the present disclosure may also be executed in any other appropriate manner in the above application examples, and the advantageous effects obtained by the embodiments of the present disclosure can still be achieved. Moreover, the embodiments of the present disclosure may also be applied to other similar application instances, and the advantageous effects obtained by the embodiments of the present disclosure can still be achieved.

It should be understood that machine-executable instructions in a machine-readable storage medium or program product according to embodiments of the present disclosure may be configured to perform operations corresponding to the device and method embodiments described above. When referring to the above device and method embodiments, the embodiments of the machine-readable storage medium or program product will be apparent to those skilled in the art, and therefore description thereof will not be repeated. Machine-readable storage media and program products for carrying or including the above machine-executable instructions also fall within the scope of the present disclosure. Such storage media may include, but are not limited to, floppy disks, optical disks, magneto-optical disks, memory cards, memory sticks, and the like.

Figure 14:
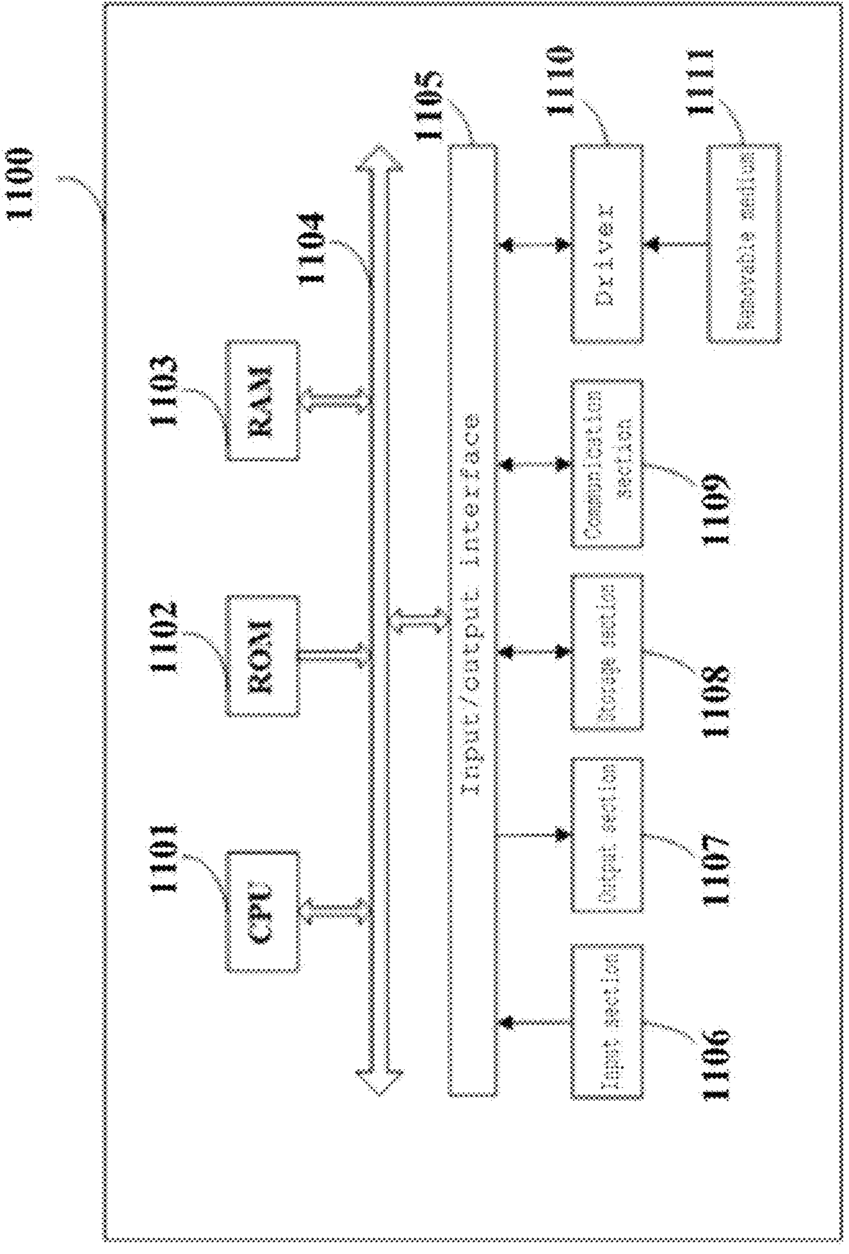
FIG. 14 is a block diagram of an example structure of a personal computer as an information processing device that may be employed in an embodiment of the present disclosure.

In addition, it should be understood that the above series of processes and devices may also be implemented by software and/or firmware. In a case of being implemented by software and/or firmware, a program constituting the software is installed from a storage medium m or a network to a computer having a dedicated hardware structure, such as a general-purpose personal computer 1100 shown in FIG. 14, which, when is installed with various programs, may perform various functions and so on. FIG. 14 is a block diagram showing an example structure of a personal computer as an information processing device that may be employed in an embodiment of the present disclosure. In one example, the personal computer may correspond to the above exemplary terminal device according to the present disclosure.

In FIG. 14, a central processing unit (CPU) 1101 executes various processes according to a program stored in a read only memory (ROM) 1102 or a program loaded from a storage section 1108 to a random access memory (RAM) 1103. In the RAM 1103, data required when the CPU 1101 executes various processes and the like is also stored as necessary.

The CPU 1101, the ROM 1102, and the RAM 1103 are connected to each other via a bus 1104. Input/output interface 1105 is also connected to the bus 1104.

The following components are connected to the input/output interface 1105: an input section 1106 including a keyboard, mouse, etc.; an output section 1107 including a display such as a cathode ray tube (CRT), a liquid crystal display (LCD), etc., and a speaker, etc.; a storage section 1108 including a hard disk etc.; and a communication section 1109, including a network interface card such as a LAN card, a modem, etc. The communication section 1109 performs communication processing via a network such as the Internet.

The driver 1110 is also connected to the input/output interface 1105 as needed. A removable medium 1111 such as a magnetic disk, an optical disk, a magneto-optical disk, a semiconductor memory and the like is mounted on the drive 1110 as needed, so that a computer program read therefrom is installed into the storage section 1108 as needed.

In a case that the above series of processing is implemented by software, a program constituting the software is installed from a network such as the Internet or a storage medium such as a removable medium 1111.

It should be understood by those skilled in the art that such a storage medium is not limited to the removable medium 1111 shown in FIG. 14 in which a program is stored and distributed separately from the device to provide the program to the user. Examples of the removable media 1111 include magnetic disks (including floppy disks (registered trademark)), optical disks (including compact disk read only memory (CD-ROM) and digital versatile disks (DVD)), magneto-optical disks (including mini discs (MD) (registered trademark)) and semiconductor memories. Alternatively, the storage medium may be the ROM 1102, a hard disk included in the storage section 1108, or the like, in which programs are stored and distributed to users together with the devices containing them.

The techniques of the present disclosure may be applied to various products.

For example, the electronic device 200 according to an embodiment of the present disclosure may be implemented as or included in various network devices/base stations, while the method shown in FIG. 12 may also be implemented by various network devices/base stations. For example, the electronic devices 300 according to the embodiments of the present disclosure may be implemented as or included in various user equipments/terminal devices, while the methods shown in FIG. 13 may also be implemented by various user equipments/terminal devices.

For example, the network device/base station mentioned in this disclosure may be implemented as any type of base station, e.g., an evolved Node B (gNB). The gNB may include one or more Transmit and Receive Points (TRPs). User equipment may connect to one or more TRPs within one or more gNBs. For example, a user equipment may be able to receive transmissions from a plurality of gNBs (and/or a plurality of TRPs provided by the same gNB). For example, The gNB may include a macro gNB and a small gNB. The small gNBs may be a gNB covering a cell smaller than macro cell, such as a pico gNB, a micro gNB, and a home (femto) gNB. Alternatively, the base station may be implemented as any other type of base station, such as a NodeB and a Base Transceiver Station (BTS). The base station may include: a body (also referred to as a base station device) configured to control wireless communication; and one or more Remote Radio Heads (RRHs) disposed at a different place from the body. In addition, various types of terminals to be described below may each operate as a base station by temporarily or semi-persistently performing base station functions.

For example, the user equipments mentioned in this disclosure, also referred to as terminal devices in some examples, may be implemented as mobile terminals (such as smart phones, tablet personal computers (PCs), notebook PCs, portable game terminals, portable/dongle-type mobile routers and digital cameras) or in-vehicle terminals (such as car navigation devices). The user equipments may also be implemented as terminals performing machine-to-machine (M2M) communication (also referred to as machine type communication (MTC) terminals). Furthermore, the user equipments may be wireless communication modules (such as integrated circuit modules comprising a single die) mounted on each of the above terminals. In some cases, the user equipments may communicate using a variety of wireless communication technologies. For example, the user equipments may be configured to communicate using two or more of GSM, UMTS, CDMA2000, WiMAX, LTE, LTE-A, WLAN, NR, Bluetooth, and the like. In some cases, the user equipments may also be configured to communicate using only one wireless communication technology.

Examples according to the present disclosure will be described below with reference to FIGS. 15 to 18.

Examples of Base Stations

It should be understood that the term base station in this disclosure has the full breadth of its ordinary meaning and includes at least a wireless communication station used as part of a wireless communication system or a radio system to facilitate communication. Examples of base stations may be, for example, but not limited to: a base station may be one or both of a base transceiver station (BTS) and a base station controller (BSC) in a GSM system, may be one or both of a radio network controller (RNC) and Node B in a WCDMA system, may be an eNB in a LTE and LTE-Advanced system, or may be a corresponding network node in a future communication system (for example, a gNB, an eLTE eNB and the like that may appear in a 5G communication system). Some functions in the base stations of the present disclosure may also be implemented as entities with control functions to communication in D2D, M2M and V2V communication scenarios, or as entities with spectrum coordination functions in cognitive radio communication scenarios.

First Example

Figure 15:
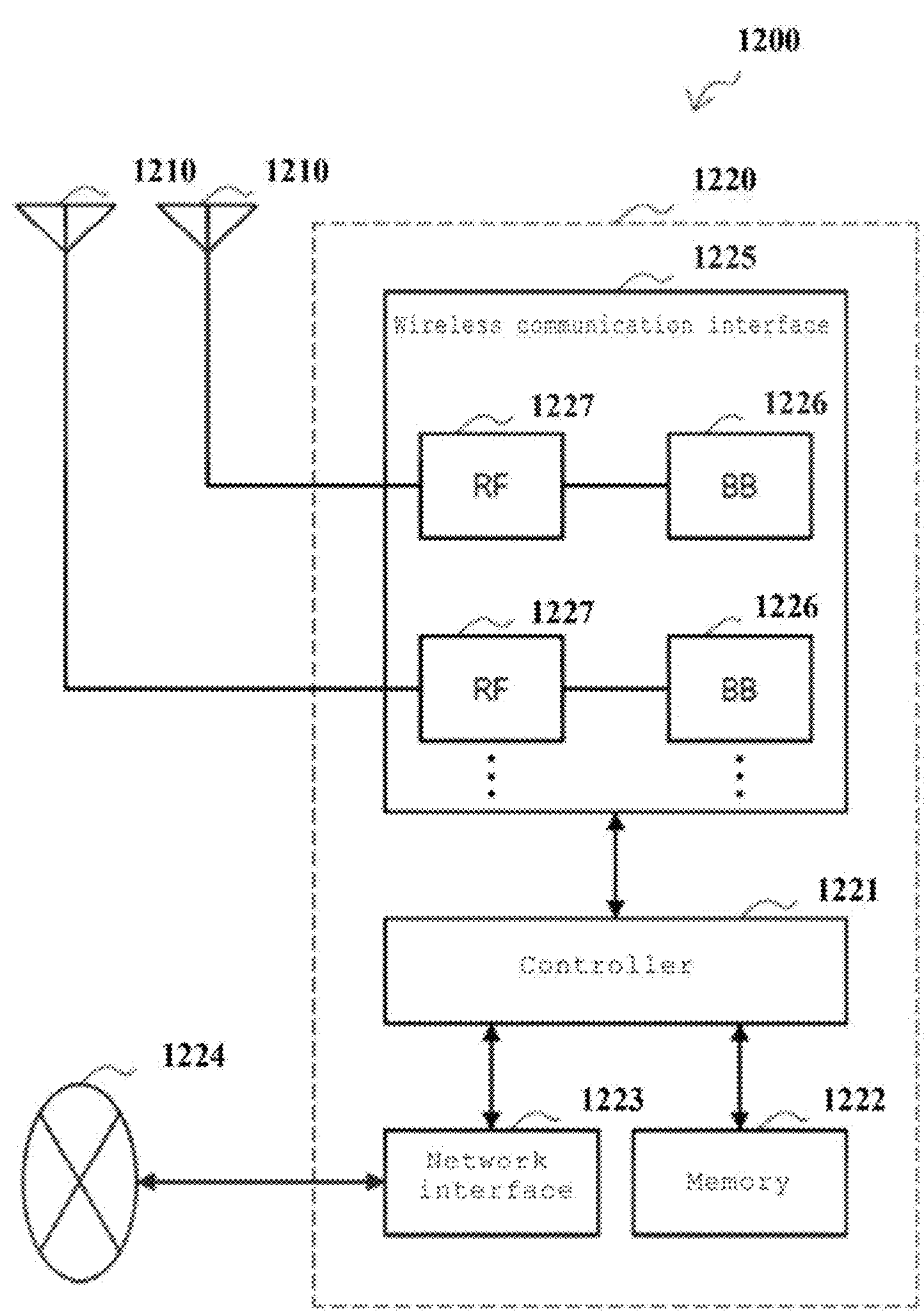
FIG. 15 is a block diagram showing a first example of a schematic configuration of a base station to which the technology of the present disclosure may be applied.

FIG. 15 is a block diagram showing a first example of a schematic configuration of a base station (a gNB is taken as an example in this figure) to which the technology of the present disclosure may be applied. The gNB 1200 includes multiple antennas 1210 and a base station device 1220. The base station device 1220 and each antenna 1210 may be connected to each other via an RF cable. In one implementation, the gNB 1200 (or the base station device 1220) here may correspond to the above network device 101 (or more specifically, the electronic device 200).

Each of the antennas 1210 includes a single or multiple antenna elements (such as multiple antenna elements included in a multiple-input multiple-output (MIMO) antenna), and is used by the base station device 1220 to transmit and receive wireless signals. As shown in FIG. 15, the gNB 1200 may include multiple antennas 1210. For example, the multiple antennas 1210 may be compatible with multiple frequency bands used by the gNB 1200.

The base station device 1220 includes a controller 1221, a memory 1222, a network interface 1223, and a wireless communication interface 1225.

The controller 1221 may be, for example, a CPU or a DSP, and operates various functions of a higher layer of the base station device 1220. For example, the controller 1221 generates data packets from the data in the signal processed by the wireless communication interface 1225, and delivers the generated packets via the network interface 1223. The controller 1221 may bundle data from a plurality of baseband processors to generate a bundled packet, and deliver the generated bundled packet. The controller 1221 may have logical functions to perform controls such as radio resource control, radio bearer control, mobility management, admission control, and scheduling. These controls may be performed in conjunction with nearby gNBs or core network nodes. The memory 1222 includes RAM and ROM, and stores programs executed by the controller 1221 and various types of control data (such as a terminal list, transmission power data, and scheduling data).

The network interface 1223 is a communication interface for connecting the base station device 1220 to the core network 1224. The controller 1221 may communicate with core network nodes or further gNBs via the network interface 1223. In this case, the gNB 1200 and core network nodes or other gNBs may be connected to each other through logical interfaces (such as S1 interface and X2 interface). The network interface 1223 may also be a wired communication interface or a wireless communication interface for wireless backhaul. If the network interface 1223 is a wireless communication interface, the network interface 1223 may use a higher frequency band for wireless communication than the frequency band used by the wireless communication interface 1225.

The wireless communication interface 1225 supports any cellular communication scheme (such as Long Term Evolution (LTE) and LTE-Advanced), and provides wireless connectivity to terminals located in cells of the gNB 1200 via the antenna 1210. The wireless communication interface 1225 may generally include, for example, a baseband (BB) processor 1226 and RF circuit 1227. The BB processor 1226 may perform, for example, encoding/decoding, modulation/demodulation, and multiplexing/demultiplexing, and performs various types of signal processing in layers (for example, L1, Medium Access Control (MAC), Radio Link Control (RLC), and Packet Data Convergence Protocol (PDCP)). In place of the controller 1221, the BB processor 1226 may have some or all of the above logical functions. The BB processor 1226 may be a memory storing a communication control program, or a module including a processor and associated circuit configured to execute the program. Updating the program may cause the functionality of the BB processor 1226 to change. The module may be a card or blade that is inserted into a slot in the base station device 1220. Alternatively, the module may also be a chip mounted on a card or blade. Meanwhile, the RF circuit 1227 may include, for example, a mixer, a filter, and an amplifier, and transmit and receive wireless signals via the antenna 1210. Although FIG. 15 illustrates an example in which one RF circuit 1227 is connected to one antenna 1210, the present disclosure is not limited to this, instead, one RF circuit 1227 may connect multiple antennas 1210 at the same time.

As shown in FIG. 15, the wireless communication interface 1225 may include multiple BB processors 1226. For example, the multiple BB processors 1226 may be compatible with multiple frequency bands used by the gNB 1200. As shown in FIG. 15, the wireless communication interface 1225 may include multiple RF circuits 1227. For example, the multiple RF circuits 1227 may be compatible with multiple antenna elements. Although FIG. 15 illustrates an example in which the wireless communication interface 1225 includes multiple BB processors 1226 and multiple RF circuits 1227, the wireless communication interface 1225 may also include a single BB processor 1226 or a single RF circuit 1227.

Second Example

Figure 16:
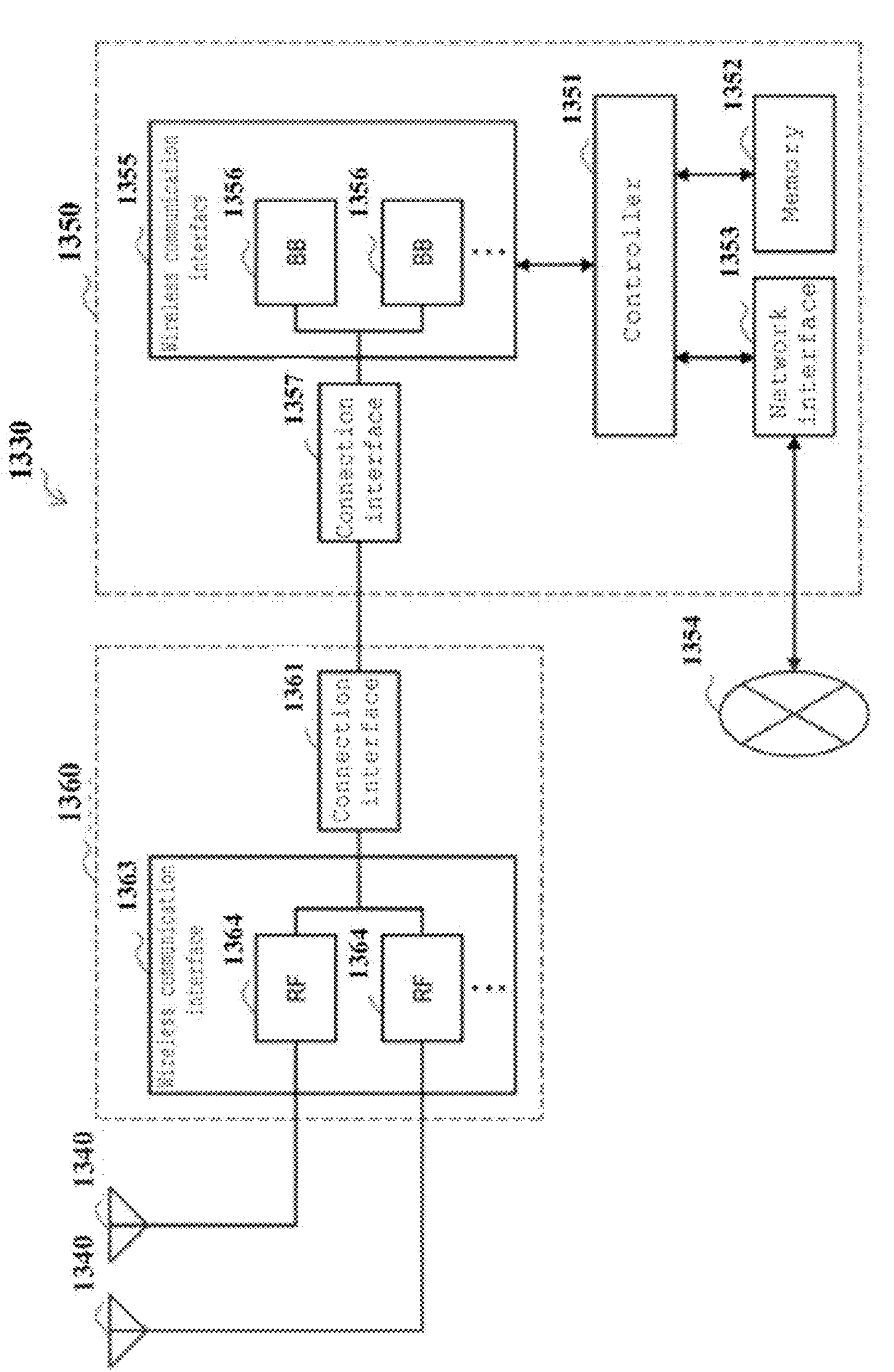
FIG. 16 is a block diagram showing a second example of a schematic configuration of a base station to which the technology of the present disclosure may be applied.

FIG. 16 is a block diagram showing a second example of a schematic configuration of a base station (a gNB is taken as an example in this figure) to which the technology of the present disclosure may be applied. The gNB 1330 includes multiple antennas 1340, a base station device 1350, and a RRH 1360. The RRH 1360 and each antenna 1340 may be connected to each other via an RF cable. The base station device 1350 and the RRH 1360 may be connected to each other via a high-speed line such as an optical fiber cable. In one implementation, the gNB 1330 (or the base station device 1350) here may correspond to the above network device 101 (or more specifically, the electronic device 200).

Each of the antennas 1340 includes a single or multiple antenna elements (such as multiple antenna elements included in a MIMO antenna) and is used by the RRH 1360 to transmit and receive wireless signals. As shown in FIG. 16, the gNB 1330 may include multiple antennas 1340. For example, the multiple antennas 1340 may be compatible with multiple frequency bands used by the gNB 1330.

The base station device 1350 includes a controller 1351, a memory 1352, a network interface 1353, a wireless communication interface 1355, and a connection interface 1357. The controller 1351, the memory 1352 and the network interface 1353 are the same as the controller 1221, the memory 1222 and the network interface 1223 described with reference to FIG. 15.

The wireless communication interface 1355 supports any cellular communication scheme (such as LTE and LTE-Advanced), and provides wireless communication to terminals located in the sector corresponding to RRH 1360 via RRH 1360 and antenna 1340. The wireless communication interface 1355 may generally include, for example, a BB processor 1356. The BB processor 1356 is the same as the BB processor 1226 described with reference to FIG. 15, except that the BB processor 1356 is connected to the RF circuit 1364 of the RRH 1360 via the connection interface 1357. As shown in FIG. 16, the wireless communication interface 1355 may include multiple BB processors 1356. For example, the multiple BB processors 1356 may be compatible with multiple frequency bands used by the gNB 1330. Although FIG. 16 illustrates an example in which the wireless communication interface 1355 includes multiple BB processors 1356, the wireless communication interface 1355 may include a single BB processor 1356.

The connection interface 1357 is an interface for connecting the base station device 1350 (the wireless communication interface 1355) to the RRH 1360. The connection interface 1357 may also be a communication module for communication in the above high-speed line connecting the base station device 1350 (the wireless communication interface 1355) to the RRH 1360.

The RRH 1360 includes a connection interface 1361 and a wireless communication interface 1363.

The connection interface 1361 is an interface for connecting the RRH 1360 (the wireless communication interface 1363) to the base station device 1350. The connection interface 1361 may also be a communication module for communication in the above high-speed line.

The wireless communication interface 1363 transmits and receives wireless signals via the antenna 1340. The wireless communication interface 1363 may typically include an RF circuit 1364, for example. The RF circuit 1364 may include, for example, a mixer, a filter, and an amplifier, and transmit and receive wireless signals via antenna 1340. Although FIG. 16 illustrates an example in which one RF circuit 1364 is connected to one antenna 1340, the present disclosure is not limited to this, instead, one RF circuit 1364 may be connected to multiple antennas 1340 at the same time.

As shown in FIG. 16, the wireless communication interface 1363 may include multiple RF circuits 1364. For example, the multiple RF circuits 1364 may support multiple antenna elements. Although FIG. 16 illustrates an example in which the wireless communication interface 1363 includes multiple RF circuits 1364, the wireless communication interface 1363 may include a single RF circuit 1364.

EXAMPLES FOR USER EQUIPMENTS

First Example

Figure 17:
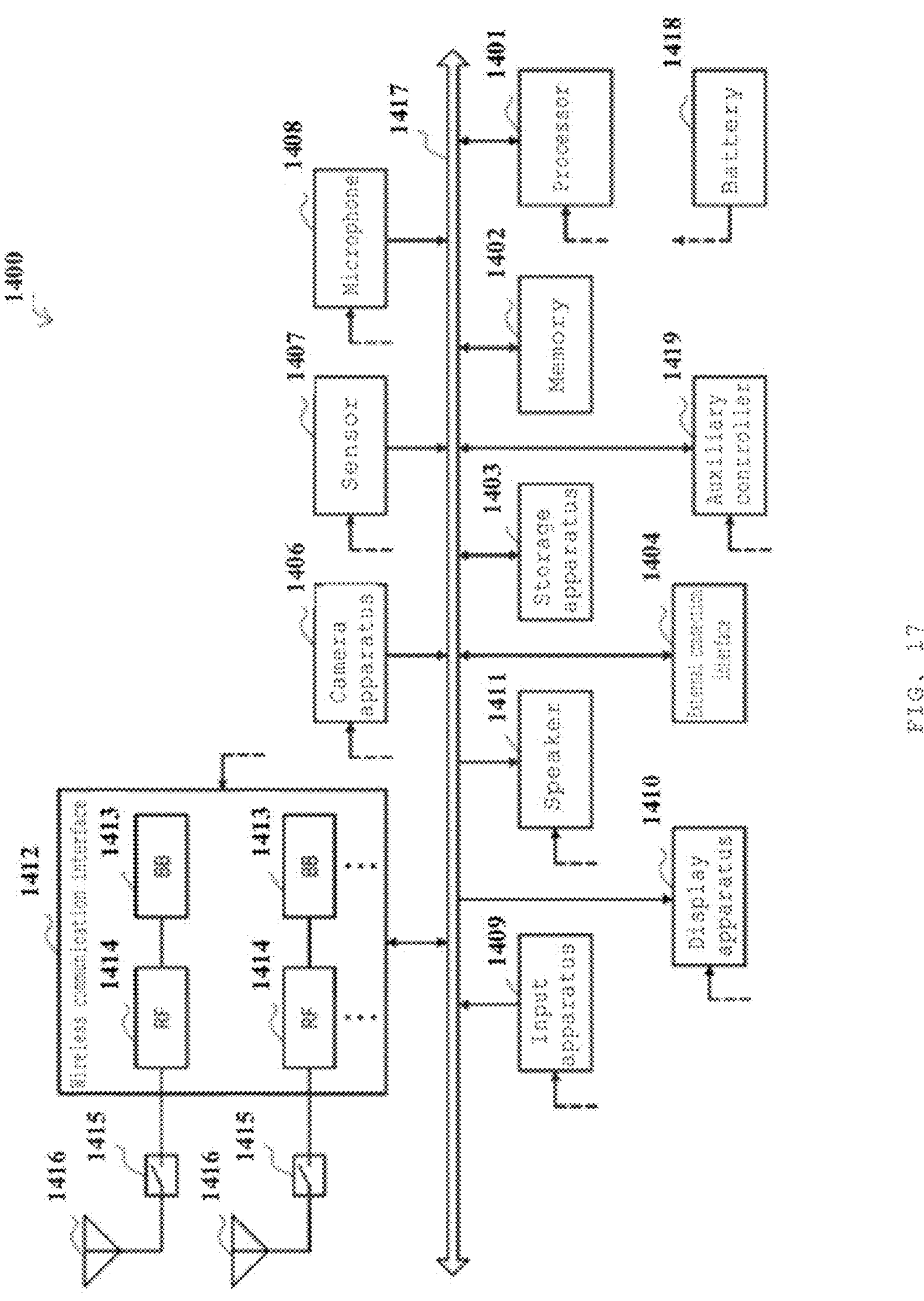
FIG. 17 is a block diagram showing an example of a schematic configuration of a smartphone to which the technology of the present disclosure may be applied.

FIG. 17 is a block diagram showing an example of a schematic configuration of a smart phone 1400 to which the techniques of the present disclosure may be applied. The smart phone 1400 includes a processor 1401, a memory 1402, a storage apparatus 1403, an external connection interface 1404, a camera apparatus 1406, a sensor 1407, a microphone 1408, an input apparatus 1409, a display apparatus 1410, a speaker 1411, a wireless communication interface 1412, one or more antenna switches 1415, one or more antennas 1416, a bus 1417, a battery 1418, and an auxiliary controller 1419. In one implementation, the smart phone 1400 (or the processor 1401) here may correspond to the above user equipment 102 (or more specifically, the electronic devices 300).

The processor 1401 may be, for example, a CPU or a system on a chip (SoC), and controls functions of the application layer and further layers of the smart phone 1400. The memory 1402 includes RAM and ROM, and stores data and programs executed by the processor 1401. The storage apparatus 1403 may include a storage medium such as a semiconductor memory and a hard disk. The external connection interface 1404 is an interface for connecting an external apparatus (such as a memory card and a Universal Serial Bus (USB) apparatus) to the smart phone 1400.

The camera apparatus 1406 includes an image sensor (such as a charge coupled device (CCD) and a complementary metal oxide semiconductor (CMOS)), and generates captured images. The sensor 1407 may include a set of sensors, such as measurement sensors, gyroscope sensors, geomagnetic sensors, and acceleration sensors. The microphone 1408 converts the sound input to the smart phone 1400 into an audio signal. The input apparatus 1409 includes, for example, a touch sensor configured to detect a touch on the screen of the display apparatus 1410, a keypad, a keyboard, a button, or a switch, and receives operations or information input from a user. The display apparatus 1410 includes a screen (such as a liquid crystal display (LCD) and an organic light emitting diode (OLED) display), and displays an output image of the smart phone 1400. The speaker 1411 converts an audio signal output from the smart phone 1400 into sound.

The wireless communication interface 1412 supports any cellular communication scheme (such as LTE and LTE-Advanced), and performs wireless communication. The wireless communication interface 1412 may generally include, for example, a BB processor 1413 and an RF circuit 1414. The BB processor 1413 may perform, for example, encoding/decoding, modulation/demodulation, and multiplexing/demultiplexing, and perform various types of signal processing for wireless communication. Meanwhile, the RF circuit 1414 may include, for example, a mixer, a filter, and an amplifier, and transmit and receive wireless signals via the antenna 1416. The wireless communication interface 1412 may be a chip module on which the BB processor 1413 and the RF circuit 1414 are integrated. As shown in FIG. 17, the wireless communication interface 1412 may include multiple BB processors 1413 and multiple RF circuits 1414. Although FIG. 17 illustrates an example in which the wireless communication interface 1412 includes multiple BB processors 1413 and multiple RF circuits 1414, the wireless communication interface 1412 may include a single BB processor 1413 or a single RF circuit 1414.

Furthermore, in addition to cellular communication schemes, the wireless communication interface 1412 may support additional types of wireless communication schemes, such as short-range wireless communication schemes, near field communication schemes, and wireless local area network (LAN) schemes. In this case, the wireless communication interface 1412 may include a BB processor 1413 and an RF circuit 1414 for each wireless communication scheme.

Each of the antenna switches 1415 switches the connection destination of the antenna 1416 among a plurality of circuits (e.g., for different wireless communication schemes) included in the wireless communication interface 1412.

Each of the antennas 1416 includes a single or multiple antenna elements (such as multiple antenna elements included in a MIMO antenna), and is used for the wireless communication interface 1412 to transmit and receive wireless signals. As shown in FIG. 17, the smart phone 1400 may include multiple antennas 1416. Although FIG. 17 illustrates an example in which the smart phone 1400 includes multiple antennas 1416, the smart phone 1400 may also include a single antenna 1416.

Furthermore, the smart phone 1400 may include an antenna 1416 for each wireless communication scheme. In this case, the antenna switch 1415 may be omitted from the configuration of the smart phone 1400.

The bus 1417 connects the processor 1401, the memory 1402, the storage apparatus 1403, the external connection interface 1404, the camera apparatus 1406, the sensor 1407, the microphone 1408, the input apparatus 1409, the display apparatus 1410, the speaker 1411, the wireless communication interface 1412, and the auxiliary controller 1419 to each other. The battery 1418 provides power to the various blocks of the smart phone 1400 shown in FIG. 17 via feeders, which are partially shown in dashed lines in the figure. The auxiliary controller 1419 operates the minimum necessary functions of the smart phone 1400, e.g., in sleep mode.

Second Example

Figure 18:
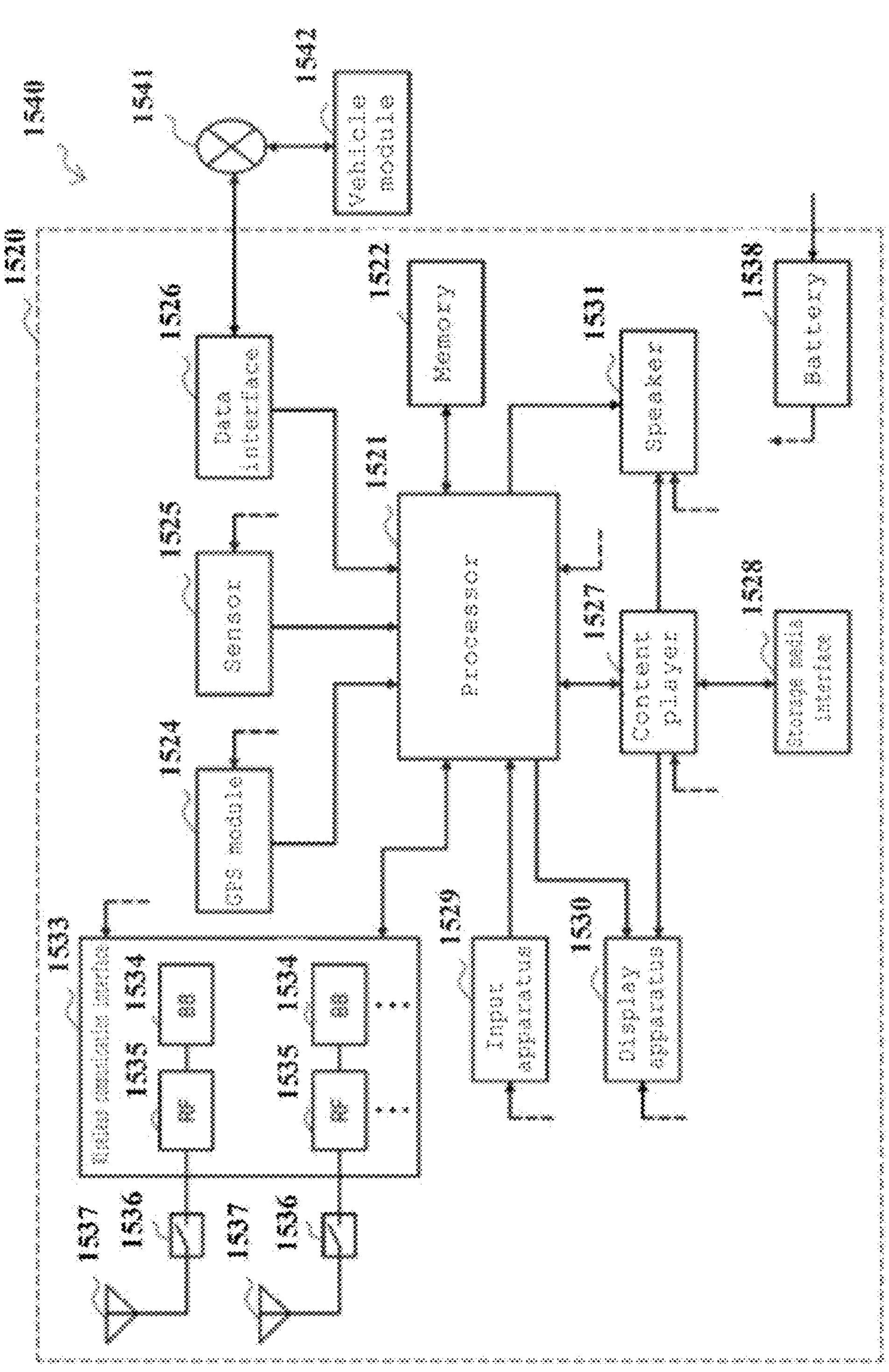
FIG. 18 is a block diagram showing an example of a schematic configuration of a vehicle navigation device to which the technology of the present disclosure may be applied.

FIG. 18 is a block diagram showing an example of a schematic configuration of a car navigation device 1520 to which the technology of the present disclosure may be applied. The car navigation device 1520 includes a processor 1521, a memory 1522, a global positioning system (GPS) module 1524, a sensor 1525, a data interface 1526, a content player 1527, a storage medium interface 1528, an input apparatus 1529, a display apparatus 1530, a speaker 1531, a wireless Communication interface 1533, one or more antenna switches 1536, one or more antennas 1537, and a battery 1538. In one implementation, the car navigation device 1520 (or the processor 1521) here may correspond to the above user equipment 102 (or more specifically, the electronic device 300).

The processor 1521 may be, for example, a CPU or a SoC, and controls the navigation function and other functions of the car navigation device 1520. The memory 1522 includes RAM and ROM, and stores data and programs executed by the processor 1521.

The GPS module 1524 uses GPS signals received from GPS satellites to measure the location (such as latitude, longitude, and altitude) of the car navigation device 1520. The sensor 1525 may include a set of sensors such as a gyroscope sensor, a geomagnetic sensor, and an air pressure sensor. The data interface 1526 is connected to, for example, an in-vehicle network 1541 via a terminal not shown, and acquires data (such as vehicle speed data) generated by the vehicle.

The content player 1527 reproduces content stored in storage media (such as CDs and DVDs), which are inserted into the storage media interface 1528. The input apparatus 1529 includes, for example, a touch sensor configured to detect a touch on the screen of the display apparatus 1530, a button, or a switch, and receives operations or information input from a user. The display apparatus 1530 includes a screen such as an LCD or OLED display, and displays images of a navigation function or reproduced content. The speaker 1531 outputs the sound of the navigation function or the reproduced content.

The wireless communication interface 1533 supports any cellular communication scheme (such as LTE and LTE-Advanced), and performs wireless communication. The wireless communication interface 1533 may generally include, for example, BB processor 1534 and RF circuit 1535. The BB processor 1534 may perform, for example, encoding/decoding, modulation/demodulation, and multiplexing/demultiplexing, and perform various types of signal processing for wireless communication. Meanwhile, the RF circuit 1535 may include, for example, a mixer, a filter, and an amplifier, and transmit and receive wireless signals via the antenna 1537. The wireless communication interface 1533 may also be a chip module on which the BB processor 1534 and the RF circuit 1535 are integrated. As shown in FIG. 18, the wireless communication interface 1533 may include multiple BB processors 1534 and multiple RF circuits 1535. Although FIG. 18 illustrates an example in which the wireless communication interface 1533 includes multiple BB processors 1534 and multiple RF circuits 1535, the wireless communication interface 1533 may also include a single BB processor 1534 or a single RF circuit 1535.

Furthermore, in addition to the cellular communication scheme, the wireless communication interface 1533 may support another type of wireless communication scheme, such as a short-range wireless communication scheme, a near field communication scheme, and a wireless LAN scheme. In this case, the wireless communication interface 1533 may include the BB processor 1534 and the RF circuit 1535 for each wireless communication scheme.

Each of the antenna switches 1536 switches the connection destination of the antenna 1537 among a plurality of circuits (such as circuits for different wireless communication schemes) included in the wireless communication interface 1533.

Each of the antennas 1537 includes a single or multiple antenna elements (such as multiple antenna elements included in a MIMO antenna), and is used for the wireless communication interface 1533 to transmit and receive wireless signals. As shown in FIG. 18, the car navigation device 1520 may include multiple antennas 1537. Although FIG. 18 illustrates an example in which the car navigation device 1520 includes multiple antennas 1537, the car navigation device 1520 may also include a single antenna 1537.

Furthermore, the car navigation device 1520 may include an antenna 1537 for each wireless communication scheme. In this case, the antenna switch 1536 may be omitted from the configuration of the car navigation device 1520.

The battery 1538 provides power to various blocks of the car navigation device 1520 shown in FIG. 18 via feeders, which are partially shown in dashed lines in the figure. The battery 1538 accumulates power supplied from the vehicle.

The techniques of this disclosure may also be implemented as an in-vehicle system (or vehicle) 1540 including one or more blocks of the car navigation device 1520, the in-vehicle network 1541, and the vehicle module 1542. The vehicle module 1542 generates vehicle data (such as vehicle speed, engine speed, and fault information), and outputs the generated data to the in-vehicle network 1541.

The exemplary embodiments of the present disclosure have been described above with reference to the drawings, but the present disclosure is not of course limited to the above examples. Those skilled in the art may find various changes and modifications within the scope of the appended claims, and it should be understood that these changes and modifications will naturally fall within the technical scope of the present disclosure.

For example, a plurality of functions included in one unit in the above embodiments may be implemented by separate apparatus. Alternatively, the plurality of functions implemented by multiple units in the above embodiments may be implemented by separate apparatus, respectively. Additionally, one of the above functions may be implemented by multiple units. Needless to say, such a configuration is included in the technical scope of the present disclosure.

In this specification, the steps described in the flowchart include not only processes performed in time sequence in the stated order, but also processes performed in parallel or individually rather than necessarily in time sequence. Furthermore, even in the steps processed in time sequence, needless to say, the order may be appropriately changed.

Although the present disclosure and its advantages have been described in detail, it should be understood that various changes, substitutions and alterations may be made herein without departing from the spirit and scope of the disclosure as defined by the appended claims. Furthermore, the terms "comprise", "include" or any other variation thereof in embodiments of the present disclosure are intended to encompass a non-exclusive inclusion, such that a process, method, article or device comprising a series of elements includes not only those elements, but also include other elements not expressly listed, or include elements inherent to such process, method, article or device. Without further limitation, an element defined by the phrase "comprising one . . . " does not preclude the presence of additional identical elements in a process, method, article or device that includes the element.

What is claimed is:

1. A network device in a wireless communication system, the network device comprising a processing circuit configured to cause the network device to perform the following operations:

instructing a user equipment in the wireless communication system to send uplink reference signals to the network device using a first set of beams;

measuring transmission quality metrics of the uplink reference signals sent in each beam direction of the first set of beams; and instructing the user equipment to send uplink reference signals to the network device using a second set of beams based at least on a transmission quality metric of an uplink reference signal sent in at least one beam direction of the first set of beams being lower than a threshold, wherein, the second set of beams enables the user equipment to avoid sending uplink reference signals in beam directions that are interfered by a communication link of a hidden node device, wherein the hidden node device is unknown to the network device and the user equipment.

2. The network device according to claim 1, wherein the uplink reference signals include sounding reference signal (SRS).

3. The network device according to claim 2, wherein the instructing of beam directions of the uplink reference signals is achieved by instructing downlink reference signals having a quasi-co-located (QCL) association with the uplink reference signals, wherein the downlink reference signals include synchronization signal block (SSB), channel state information reference signal (CSI-RS), and/or positioning reference signal (PRS).

4. The network device according to claim 1, the processing circuit is further configured to cause the network device to perform the following operation:

at least in response to a transmission quality metric of an uplink reference signal sent in at least one beam direction of the first set of beams being lower than the threshold and a transmission quality metric of an uplink reference signal sent in at least one other beam direction of the first set of beams being not lower than the threshold, updating all beams in the first set of beams whose transmission quality metric is lower than the threshold to beams with the same or close beam direction as the beam with the highest transmission quality metric in the first set of beams, thereby forming a second set of beams.

5. The network device according to claim 1, the processing circuit is further configured to cause the network device to perform the following operation:

at least in response to transmission quality metrics of the uplink reference signals sent in all beam directions in the first set of beams being lower than the threshold, instructing the user equipment to re-perform omni-directional beam scanning, and updating all beams in the beams for omni-directional beam scanning with transmission quality metric lower than the threshold to beams with the same or close beam direction as the beam with the highest transmission quality metric in omni-directional beam scanning, thereby forming a second set of beams.

6. The network device according to claim 1, the processing circuit is further configured to cause the network device to perform the following operation:

based at least on the transmission quality metrics of the uplink reference signals sent in all beam directions in the first set of beams being not lower than the threshold, not instructing the user equipment to use the second set of beams, so that the user equipment continues to use the first set of beams to send uplink reference signals to the network device.

7. The network device according to claim 1, wherein the instruction to the user equipment to use the first set of beams is transmitted in one of:

uplink reference signal initial default configuration information sent by the network device to the user equipment; or uplink reference signal revise configuration information sent by the network device to the user equipment based on the latest downlink reference signal measurement result.

8. The network device according to claim 1, wherein the network device, the user equipment and the hidden node device operate in an unlicensed millimeter wave frequency band.

9. The network device according to claim 1, wherein the transmission quality metric includes one of the following or a combination of a plurality of the following: reference signal received power (RSRP), reference signal received quality (RSRQ), signal to interference plus noise ratio (SINR), or decoding rate.

10. The network device according to claim 1, wherein, instructing the user equipment to use the first set of beams and instructing the user equipment to use the second set of beams through downlink control information (DCI) in a radio resource control (RRC) information element or through a medium access control (MAC)-control element (CE).

11. The network device according to claim 1, wherein the beam direction of the user equipment for sending the uplink reference signals being interfered by a communication link of a hidden node device includes: the hidden node device being located within the coverage of the beam direction; or the hidden node device being located within the reverse coverage of the beam direction and the transmission direction of the communication link of the hidden node device being the same or close to the beam direction.

12. A user equipment in a wireless communication system, the user equipment comprising a processing circuit configured to cause the user equipment to perform the following operations:

receiving an instruction from a network device in the wireless communication system to send uplink reference signals to the network device using a first set of beams;

sending uplink reference signals to the network device in each beam direction of the first set of beams for the network device to measure transmission quality metrics of the uplink reference signals;

receiving an instruction from the network device to send uplink reference signals to the network device using a second set of beams, wherein the instruction is sent based at least on a transmission quality metric of an uplink reference signal sent in at least one beam direction of the first set of beams being lower than a threshold; and sending uplink reference signals to the network device using the second set of beams, wherein, the second set of beams enables the user equipment to avoid sending uplink reference signals in beam directions that are interfered by a communication link of a hidden node device, wherein the hidden node device is unknown to the network device and the user equipment.

13. The user equipment according to claim 12, wherein the uplink reference signals include sounding reference signal (SRS).

14. The user equipment according to claim 13, wherein the instructing of beam directions of the uplink reference signals is achieved by instructing downlink reference signals having a quasi-co-located (QCL) association with the uplink reference signals, wherein the downlink reference signals include synchronization signal block (SSB), channel state information reference signal (CSI-RS), and/or positioning reference signal (PRS).

15. The user equipment according to claim 12, wherein:

at least in a case that a transmission quality metric of an uplink reference signal sent in at least one beam direction of the first set of beams is lower than the threshold and a transmission quality metric of an uplink reference signal sent in at least one other beam direction of the first set of beams is not lower than the threshold, all beams in the first set of beams whose transmission quality metric is lower than the threshold are updated to beams with the same or close beam direction as the beam with the highest transmission quality metric in the first set of beams, thereby forming a second set of beams.

16. The user equipment according to claim 12, wherein:

at least in a case that transmission quality metrics of the uplink reference signals sent in all beam directions in the first set of beams are lower than the threshold, the user equipment re-performs omni-directional beam scanning, and all beams in the beams for omni-directional beam scanning with transmission quality metric lower than the threshold are updated to beams with the same or close beam direction as the beam with the highest transmission quality metric in the omnidirectional beam scanning, thereby forming a second set of beams.

17. The user equipment according to claim 12, wherein:

at least in a case that transmission quality metrics of the uplink reference signals sent in all beam directions in the first set of beams is not lower than the threshold, the user equipment continues to use the first set of beams to send uplink reference signals to the network device.

18. The user equipment according to claim 12, wherein the instruction to use the first set of beams is transmitted in one of:

uplink reference signal initial default configuration information received by the user equipment from the network device; or uplink reference signal revise configuration information received by the user equipment from the network device, which is sent based on the latest downlink reference signal measurement result of the network device.

19. The user equipment according to claim 12, wherein the network device, the user equipment and the hidden node device operate in an unlicensed millimeter wave frequency band.

20. The user equipment according to claim 12, wherein the transmission quality metric includes one of the following or a combination of a plurality of the following: reference signal received power (RSRP), reference signal received quality (RSRQ), signal to interference plus noise ratio (SINR), or decoding rate, wherein, the user equipment receives an instruction to use the first set of beams and an instruction to use the second set of beams through downlink control information (DCI) in a radio resource control (RRC) information element or through a medium access control (MAC)-control element (CE).

* * * * *